(12) United States Patent
Yu et al.

(10) Patent No.: US 10,451,942 B2
(45) Date of Patent: Oct. 22, 2019

(54) DISPLAY DEVICE

(71) Applicant: SAMSUNG DISPLAY CO., LTD., Yongin-si, Gyeonggi-do (KR)

(72) Inventors: Seungjun Yu, Cheonan-si (KR); Younggoo Song, Asan-si (KR); Haksun Kim, Seoul (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 15/287,863

(22) Filed: Oct. 7, 2016

(65) Prior Publication Data
US 2017/0219895 A1    Aug. 3, 2017

(30) Foreign Application Priority Data
Feb. 3, 2016  (KR) .................. 10-2016-0013229

(51) Int. Cl.
*G02F 1/1362*  (2006.01)
*G02F 1/1345*  (2006.01)
(Continued)

(52) U.S. Cl.
CPC ...... *G02F 1/136286* (2013.01); *G02F 1/1368* (2013.01); *G02F 1/13454* (2013.01);
(Continued)

(58) Field of Classification Search
CPC ............ G02F 1/136286; G02F 1/1368; G02F 1/13454; G02F 2201/56; G02F 1/134336; G02F 1/0121; G02F 1/0327; G02F 1/076; G02F 1/133; G02F 1/13306; G02F 1/1345; G02F 1/13452; G02F 1/13458; G02F 2001/133388; G02F 2001/133612; G02F 2001/13456; G02F 1/1333; G02F 1/133305; G02F 2001/133302; G02F 1/133514; G02F 1/133512; G02F 1/136209; G02F 1/13473; G02F 1/133371; G02F 2001/136222; G02F 2001/136218; G02F 1/0107; G02F 1/1339; G02F 1/1341; G02F 1/161;
(Continued)

(56) References Cited

U.S. PATENT DOCUMENTS

2008/0266210 A1* 10/2008 Nonaka .................... G09G 3/20
345/55
2009/0102824 A1* 4/2009 Tanaka ............. G02F 1/134309
345/205
(Continued)

FOREIGN PATENT DOCUMENTS

KR    1020110066333 A    6/2011
KR    1020150025774 A    3/2015

*Primary Examiner* — Shan Liu
(74) *Attorney, Agent, or Firm* — Cantor Colburn LLP

(57) ABSTRACT

A display device includes a first substrate, a plurality of pixels on the first substrate, a gate driver on the first substrate, the gate driver applying a gate signal, and a gate line connected to the gate driver and applying the gate signal to at least a pixel of the plurality of pixels where the plurality of pixels is disposed in a step-like shape in at least one corner of the first substrate, the gate driver comprises a plurality of stages in the at least one corner of the first substrate, and the plurality of stages is disposed in a step-like shape corresponding to the plurality of pixels.

24 Claims, 20 Drawing Sheets

(51) Int. Cl.
  *G02F 1/1368* (2006.01)
  *G09G 3/36* (2006.01)
  *G02F 1/1343* (2006.01)

(52) U.S. Cl.
  CPC ......... *G09G 3/3677* (2013.01); *G09G 3/3688* (2013.01); *G02F 1/134336* (2013.01); *G02F 2201/56* (2013.01); *G09G 2300/0408* (2013.01); *G09G 2300/0452* (2013.01); *G09G 2330/021* (2013.01)

(58) Field of Classification Search
  CPC ... G02F 1/136277; G02F 2001/133368; G02F 2001/133354; G09G 3/3677; G09G 3/3688; G09G 2330/021; G09G 2300/0408; G09G 2300/0452; G09G 2300/0426; G09G 3/3655; G09G 3/3674; G09G 3/3685; G09G 2290/00; G09G 2320/0223; G09G 2300/0421; G09G 3/36; H01L 23/48; H01L 23/49572; H01L 2224/50; H01L 2224/79; H01L 2224/86; H01L 2225/06579; H01L 2225/107; H01L 24/50; H01L 27/12; H01L 27/1203; H01L 27/1218; H01L 21/02367; H01J 11/44; H01J 2211/444; H01J 2329/323; H01J 29/327

USPC ......... 349/149–152, 158, 106–111, 153, 190
See application file for complete search history.

(56) References Cited

U.S. PATENT DOCUMENTS

| | | | |
|---|---|---|---|
| 2010/0141570 A1* | 6/2010 | Horiuchi | G09G 3/3611 345/100 |
| 2010/0214195 A1* | 8/2010 | Ogasawara | G02F 1/136286 345/55 |
| 2012/0112988 A1* | 5/2012 | Nakanishi | G02F 1/134309 345/76 |
| 2013/0021548 A1* | 1/2013 | Sung | G09G 3/3648 349/41 |
| 2014/0078186 A1* | 3/2014 | Chen | G09G 3/003 345/690 |
| 2015/0211707 A1* | 7/2015 | Watanabe | G02F 1/133308 345/667 |
| 2016/0190166 A1* | 6/2016 | Kim | H01L 27/124 257/71 |
| 2016/0291376 A1* | 10/2016 | Iwatsu | G02F 1/133512 |
| 2016/0351098 A1* | 12/2016 | Lin | G09G 3/20 |
| 2017/0193914 A1* | 7/2017 | Heo | G09G 3/3258 |
| 2017/0221435 A1* | 8/2017 | Shima | G09G 3/3611 |
| 2017/0322446 A1* | 11/2017 | Tae | G02F 1/133345 |
| 2017/0337859 A1* | 11/2017 | Hirata | G09G 3/006 |

* cited by examiner

DISPLAY DEVICE

This application claims priority to Korean Patent Application No. 10-2016-0013229, filed on Feb. 3, 2016, and all the benefits accruing therefrom under 35 U.S.C. § 119, the content of which in its entirety is herein incorporated by reference.

BACKGROUND

1. Field

Exemplary embodiments of the invention relate to a display device, and more particularly, to a display device including a rounded corner.

2. Description of the Related Art

Display devices are classified into a liquid crystal display ("LCD") device, an organic light emitting diode ("OLED") display device, a plasma display panel ("PDP") device, an electrophoretic display ("EPD") device, and the like, based on a light emitting scheme thereof. Among such types of the display devices, the LCD device and the OLED device are used in a wide range of applications, e.g., a television, a monitor, a smartphone, and a portable information device, by virtue of its characteristics such as slimness, light weight, and low power consumption.

SUMMARY

A flat display device typically includes a right-angled corner. However, information displayed on the right-angled corner may be poorly recognized by a user, and the right-angled corner of a curved display device may face the user, which causes unpleasant feelings to the users. Further, since recent consumers put a high value on products having a catchy design, researches are being conducted to improve designs of the display device.

Exemplary embodiments of the invention are directed to a display device including a rounded corner.

Further, exemplary embodiments of the invention are directed to a display device including a plurality of stages disposed in a step-like shape.

According to an exemplary embodiment of the invention, a display device includes a first substrate, a plurality of pixels on the first substrate, a gate driver on the first substrate, the gate driver applying a gate signal, and a gate line connected to the gate driver and applying the gate signal to at least a pixel of the plurality of pixels. The plurality of pixels may be disposed in a step-like shape in at least one corner of the first substrate, and the gate driver may include a plurality of stages in the at least one corner of the first substrate, the plurality of stages being disposed in a step-like shape corresponding to the plurality of pixels.

In an exemplary embodiment, the first substrate may have a round shape in the at least one corner.

In an exemplary embodiment, in the at least one corner of the first substrate, the gate driver may include an $i^{th}$ stage, and an $i+1^{th}$ stage disposed adjacent to the $i^{th}$ stage where i is a natural number. The $i^{th}$ stage may further protrude in an extension direction of the gate line than the $i+1^{th}$ stage does.

In an exemplary embodiment, the plurality of pixels may include an $i^{th}$ pixel row connected to the $i^{th}$ stage and an $i^{th}$ gate line, and an $i+1^{th}$ pixel row connected to the $i+1^{th}$ stage and an $i+1^{th}$ gate line. The $i+1^{th}$ pixel row may include more pixels than pixels included in the $i^{th}$ pixel row.

In an exemplary embodiment, the $i+1^{th}$ pixel row may include at least two more pixel units than pixel units included in the $i^{th}$ pixel row.

In an exemplary embodiment, the pixel unit may include a blue pixel, a red pixel, and a green pixel.

In an exemplary embodiment, the pixel unit may further include a white pixel.

In an exemplary embodiment, the $i+1^{th}$ pixel row may further include four more pixel units than pixel units included in the $i^{th}$ pixel row.

In an exemplary embodiment, in the at least one corner of the first substrate, the gate driver may include a $k^{th}$ stage, and a $k+1^{th}$ stage disposed adjacent to the $k^{th}$ stage where k is a natural number. The $k+1^{th}$ stage may further protrude in an extension direction of the gate line than the $k^{th}$ stage does.

In an exemplary embodiment, the plurality of pixels may include a $k^{th}$ pixel row connected to the $k^{th}$ stage and a $k^{th}$ gate line, and a $k+1^{th}$ pixel row connected to the $k+1^{th}$ stage and a $k+1^{th}$ gate line. The $k^{th}$ pixel row may include more pixels than pixels included in the $k+1^{th}$ pixel row.

In an exemplary embodiment, the $k^{th}$ pixel row may include at least two more pixel units than pixel units included in the $k+1^{th}$ pixel row.

In an exemplary embodiment, the plurality of pixels may be disposed along the data line based on a pixel unit.

In an exemplary embodiment, the pixel unit may include a blue pixel, a red pixel, and a green pixel.

In an exemplary embodiment, the pixel unit may further include a white pixel.

In an exemplary embodiment, the plurality of pixels may include an $i^{th}$ pixel row connected to the $i^{th}$ stage and an $i^{th}$ gate line, and an $i+1^{th}$ pixel row connected to the $i+1^{th}$ stage and an $i+1^{th}$ gate line. The $i+1^{th}$ pixel row may include at least one more pixel than pixels included in the $i^{th}$ pixel row.

In an exemplary embodiment, the display device may further include a data line, and a thin film transistor connected to the gate line and the data line.

In an exemplary embodiment, the data line may have one of a step-like shape, a diagonal shape, and a curved shape between the gate driver and a region in which the plurality of pixels is disposed.

In an exemplary embodiment, the display device may further include a light blocking unit on the first substrate. The light blocking unit may define a display area and a non-display area of the first substrate in a plan view.

In an exemplary embodiment, the light blocking unit may have a round shape corresponding to the at least one corner of the first substrate.

In an exemplary embodiment, the light blocking unit may overlap at least a pixel in the at least one corner of the first substrate.

In an exemplary embodiment, the gate driver may have a round shape corresponding to the at least one corner of the first substrate.

In an exemplary embodiment, the display device may further include a second substrate opposing the first substrate, a liquid crystal layer between the first substrate and the second substrate, and a sealing unit bonding the first substrate and the second substrate.

The foregoing is illustrative only and is not intended to be in any way limiting. In addition to the illustrative exemplary embodiments, and features described above, further exemplary embodiments, and features will become apparent by reference to the drawings and the following detailed description.

BRIEF DESCRIPTION OF THE DRAWINGS

The above and other features and exemplary embodiments of the invention will be more clearly understood from the following detailed description taken in conjunction with the accompanying drawings, in which.

DETAILED DESCRIPTION

Figure 1:
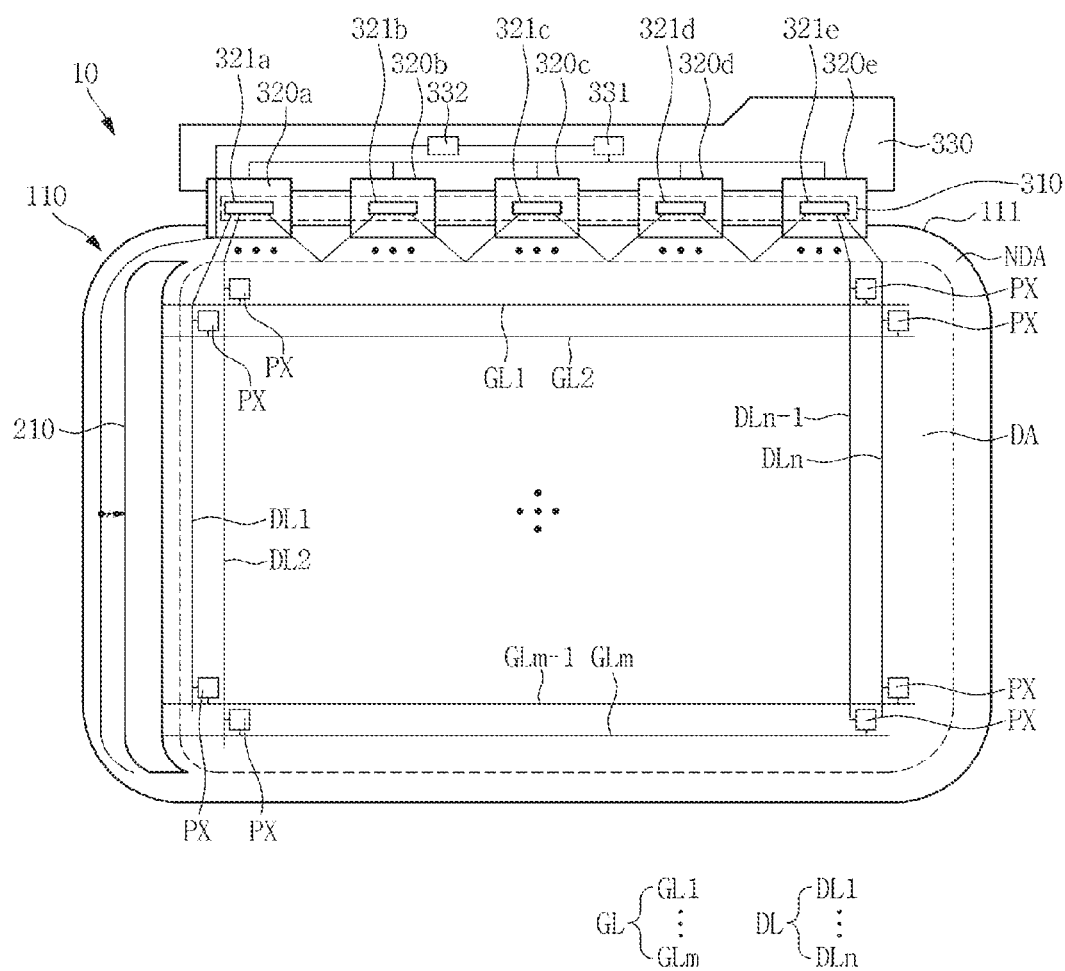
FIG. 1 is a plan view illustrating an exemplary embodiment of a display device.

Exemplary embodiments will now be described more fully hereinafter with reference to the accompanying drawings. Although the invention can be modified in various manners and have several embodiments, exemplary embodiments are illustrated in the accompanying drawings and will be mainly described in the specification. However, the scope of the invention is not limited to the exemplary embodiments and should be construed as including all the changes, equivalents, and substitutions included in the spirit and scope of the invention.

In the drawings, certain elements or shapes may be illustrated in an enlarged manner or in a simplified manner to better illustrate the invention, and other elements present in an actual product may also be omitted. Thus, the drawings are intended to facilitate the understanding of the invention.

When a layer, area, or plate is referred to as being "on" another layer, area, or plate, it may be directly on the other layer, area, or plate, or intervening layers, areas, or plates may be present therebetween. Conversely, when a layer, area, or plate is referred to as being "directly on" another layer, area, or plate, intervening layers, areas, or plates may be absent therebetween. Further when a layer, area, or plate is referred to as being "below" another layer, area, or plate, it may be directly below the other layer, area, or plate, or intervening layers, areas, or plates may be present therebetween. Conversely, when a layer, area, or plate is referred to as being "directly below" another layer, area, or plate, intervening layers, areas, or plates may be absent therebetween.

The spatially relative terms "below", "beneath", "less", "above", "upper", and the like, may be used herein for ease of description to describe the relations between one element or component and another element or component as illustrated in the drawings. It will be understood that the spatially relative terms are intended to encompass different orientations of the device in use or operation, in addition to the orientation depicted in the drawings. For example, in the case where a device shown in the drawing is turned over, the device positioned "below" or "beneath" another device may be placed "above" another device. Accordingly, the illustrative term "below" may include both the lower and upper positions. The device may also be oriented in the other direction, and thus the spatially relative terms may be interpreted differently depending on the orientations.

Throughout the specification, when an element is referred to as being "connected" to another element, the element is "directly connected" to the other element, or "electrically connected" to the other element with one or more intervening elements interposed therebetween. It will be further understood that the terms "comprises," "comprising," "includes" and/or "including," when used in this specification, specify the presence of stated features, integers, steps, operations, elements, and/or components, but do not preclude the presence or addition of one or more other features, integers, steps, operations, elements, components, and/or groups thereof.

It will be understood that, although the terms "first," "second," "third," and the like may be used herein to describe various elements, these elements should not be limited by these terms. These terms are only used to distinguish one element from another element. Thus, "a first element" discussed below could be termed "a second element" or "a third element," and "a second element" and "a third element" can be termed likewise without departing from the teachings herein.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms used herein (including technical and scientific terms) have the same meaning as commonly understood by those skilled in the art to which this invention pertains. It will be further understood that terms, such as those defined in commonly used dictionaries, should be interpreted as having a meaning that is consistent with their meaning in the context of the relevant art and will not be interpreted in an ideal or excessively formal sense unless clearly defined in the specification.

Some of the parts which are not associated with the description may not be provided in order to specifically describe embodiments of the invention, and like reference numerals refer to like elements throughout the specification.

Hereinafter, exemplary embodiments will be described with reference to FIGS. 1, 2, 3, 4, 5, 6, and 7.

FIG. 1 is a plan view illustrating an exemplary embodiment of a display device.

The exemplary embodiment of the display device is a liquid crystal display ("LCD") device 10, for example. However, the invention is not limited thereto, and the exemplary embodiment may be applied to an organic light emitting diode ("OLED") display device.

Referring to FIG. 1, the LCD device 10 includes a LCD panel 110 that displays an image and a data driver 310 that outputs a data voltage to the LCD panel 110. The LCD panel 110 includes a gate driver 210 that outputs a gate voltage.

The LCD panel 110 includes a first substrate 111, a second substrate 112 opposing the first substrate 111, and a liquid crystal layer LC between the first substrate 111 and the second substrate 112. The first substrate 111 includes a display area DA on which an image is displayed and a non-display area NDA on which an image is not displayed.

A plurality of gate lines GL1 to GLm (also represented by GL) and a plurality of data lines DL1 to DLn (also represented by DL) insulated from and intersecting the plurality of gate lines GL1 to GLm are disposed in the display area DA. In addition, pixels PX which are connected to the plurality of gate lines GL1 to GLm and the plurality of data lines DL1 to DLn, respectively, to display an image are disposed in the display area DA. Here, m and n are natural numbers greater than 1.

The gate driver 210 is disposed in the non-display area NDA adjacent to one end portion of the plurality of gate lines GL1 to GLm. The gate driver 210 is electrically connected to the one end portion of the plurality of gate lines GL1 to GLm and sequentially applies the gate voltage to the plurality of gate lines GL1 to GLm.

The data driver 310 is disposed in the non-display area NDA adjacent to one end portion of the plurality of data lines DL1 to DLn. The data driver 310 includes a plurality of driving circuit boards 320a, 320b, 320c, 320d, and 320e. In an exemplary embodiment, the plurality of driving circuit boards 320a, 320b, 320c, 320d, and 320e may be a tape carrier package ("TCP") or a chip on film ("COF"), for example. A plurality of data driving integrated circuits ("ICs") 321a, 321b, 321c, 321d, and 321e is disposed (e.g., mounted) on the plurality of driving circuit boards 320a, 320b, 320c, 320d, and 320e, respectively. The plurality of data driving ICs 321a, 321b, 321c, 321d, and 321e are electrically connected to the one end portion of the plurality of data lines DL1 to DLn to output the data voltage to the plurality of data lines DL1 to DLn.

The LCD device 10 includes a control printed circuit board ("PCB") 330 controlling operations of the gate driver 210 and the data driving ICs 321a, 321b, 321c, 321d, and 321e. The control PCB 330 outputs a data control signal and an image data to control the operation of the plurality of data driving ICs 321a, 321b, 321c, 321d, and 321e and outputs a gate control signal to control the operation of the gate driver 210.

The control PCB 330 includes a timing controller 331 that externally receives an image data and generates the data control signal and the gate control signal and a gate control circuit 332 that generates the gate control signal. However, the invention is not limited thereto, and in another exemplary embodiment, the control PCB 330 may be a data PCB that receives a control signal from still another PCB including a timing controller and thereby generates and outputs the data control signal.

The timing controller 331 controls operations of the plurality of data driving ICs 321a, 321b, 321c, 321d, and 321e and the gate driver 210. The gate control circuit 332 generates a clock signal to drive the gate driver 210 and a start signal to notice the start of the gate signal.

The control PCB 330 applies the data control signal and the image data to the plurality of data driving ICs 321a, 321b, 321c, 321d, and 321e through the plurality of driving circuit boards 320a, 320b, 320c, 320d, and 320e. In addition, the control PCB 330 applies the gate control signal to the gate driver 210 through the driving circuit board 320a that is adjacent to the gate driver 210.

However, the invention is not limited thereto, and the plurality of data driving ICs 321a, 321b, 321c, 321d, and 321e may be directly deposed (e.g., embedded) in the LCD panel 110, disposed (e.g., embedded) on a flexible printed circuit film (not illustrated) to be attached to the LCD panel 110, or disposed (e.g., embedded) on a separate PCB (not illustrated) in other exemplary embodiments. In an alternative exemplary embodiment, the plurality of data driving ICs 321a, 321b, 321c, 321d, and 321e, along with the gate lines GL1 to GLm and a thin film transistor ("TFT") TR (refer to FIG. 6), may be disposed (e.g., embedded) in the LCD panel 110. In an alternative exemplary embodiment, the plurality of data driving ICs 321a, 321b, 321c, 321d, and 321e, the timing controller 331, and the gate control circuit 332 may be integrated into a single chip.

In an exemplary embodiment, the first substrate 111 is an insulating substrate including a transparent material such as glass or plastic.

Figure 3:
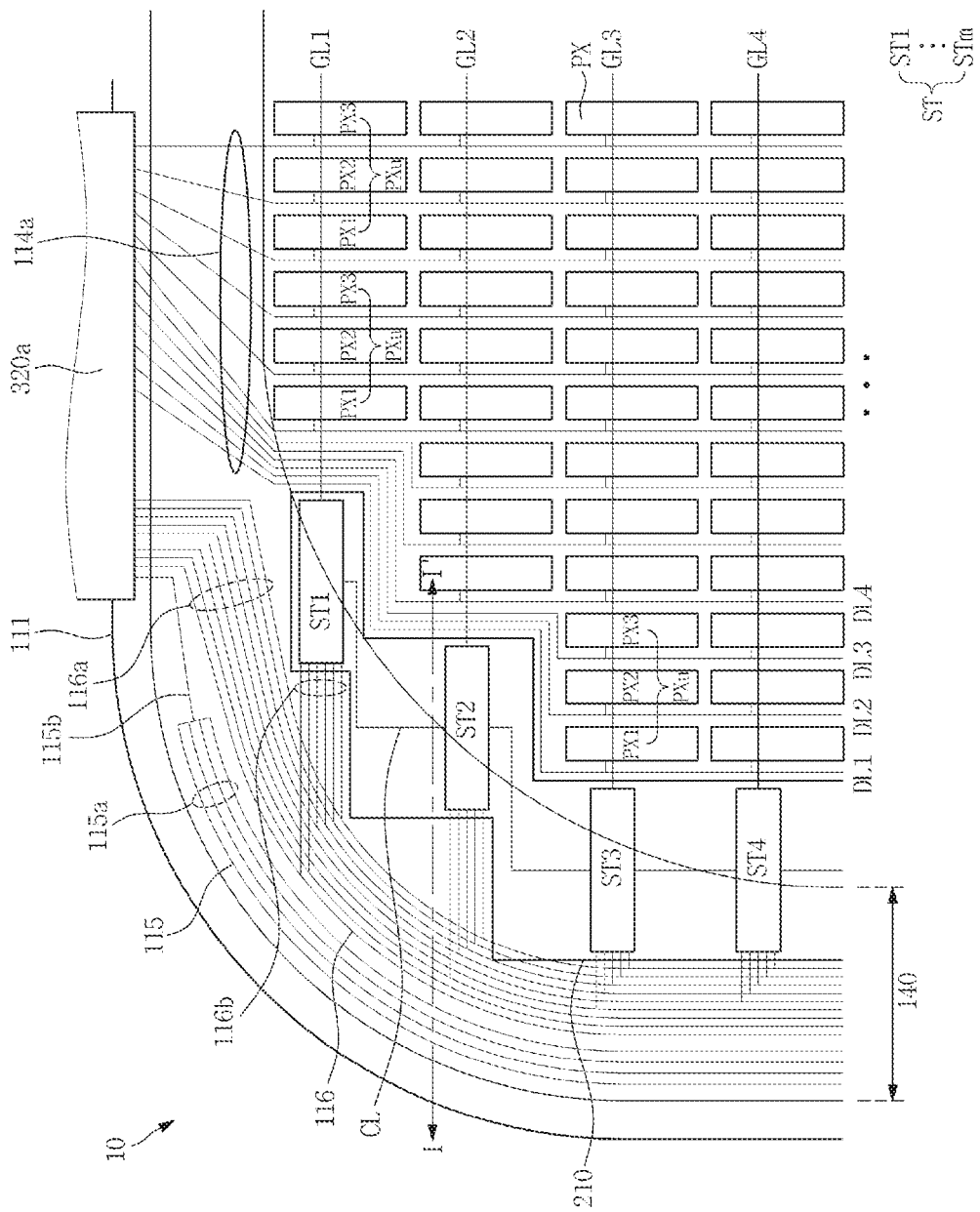
FIG. 3 is a plan view illustrating a corner portion of the exemplary embodiment of the display device.

Referring to FIGS. 1 and 3, the first substrate 111 has at least one rounded corner.

In the case that a length of a diagonal line of the first substrate 111 is "D" mm and a radius of curvature of the corner of the first substrate 111 is "R" mm, "D" and "R" may satisfy, for example, the following Formula 1.

$$0.01 \times D + 5 \leq R \leq 0.01 \times D + 15 \quad \text{[Formula 1]}$$

In addition, in the case that the length of the diagonal line of the first substrate 111 is "d" inch and the radius of curvature of the corner of the first substrate 111 is "R" mm, "d" and "R" may satisfy, for example, the following Formula 2.

$$0.25 \times d + 5 \leq R \leq 0.25 \times d + 15 \quad \text{[Formula 2]}$$

Figure 2:
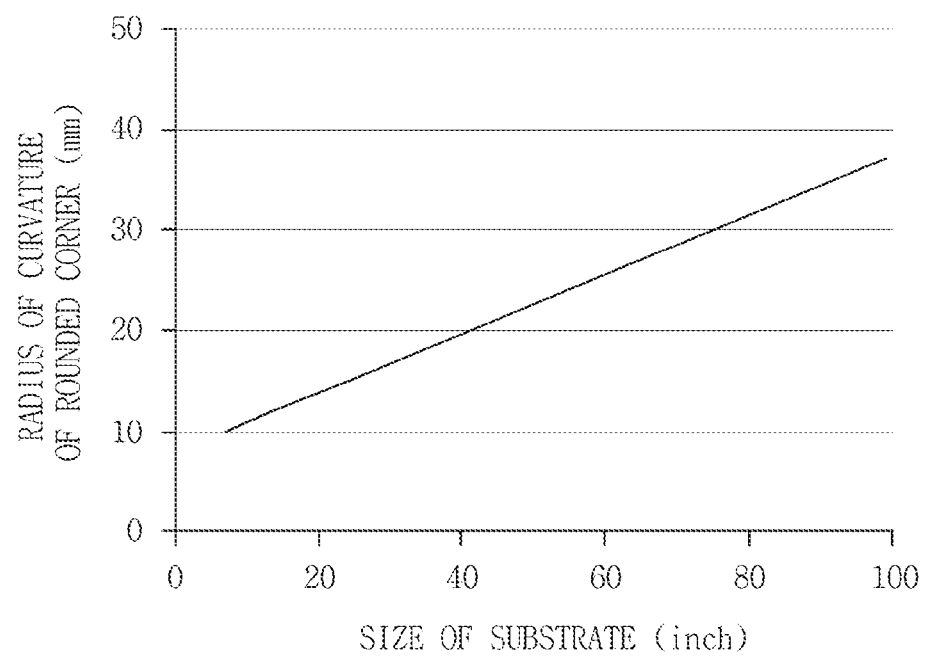
FIG. 2 is a graph illustrating a relationship between a size of a first substrate and a radius of curvature of a rounded corner of the first substrate.

A relationship between the length (unit: inch) of the diagonal line of the first substrate 111 and the radius of curvature (unit: mm) of the rounded corner may be represented by the graph illustrated in FIG. 2.

FIG. 3 is a plan view illustrating a corner portion of the exemplary embodiment of the display device of FIG. 1. FIG. 3 illustrates an upper left corner portion of the first substrate 111 that is rounded, by way of example.

Referring to FIG. 3, the plurality of gate lines GL, the plurality of data lines DL, and the plurality of pixels PX are disposed on the first substrate 111.

In addition, a data link wiring 114a, a common voltage wiring unit 115a, a gate link unit 116a, and the gate driver 210 are disposed in the non-display area NDA of the first substrate 111. The gate driver 210 includes a plurality of stages ST1, ST2, ST3, ST4 to STm (not shown).

The data link wiring 114a extends from the data line DL to electrically connect the data driver 310 (refer to FIG. 1) and the data line DL.

The common voltage wiring unit 115a includes a plurality of common voltage wirings 115 that are spaced apart from one another by a predetermined distance. An end of one side of the plurality of common voltage wirings 115 contacts a common voltage generating unit (not illustrated) through a common voltage extension wiring 115b.

Figure 5:
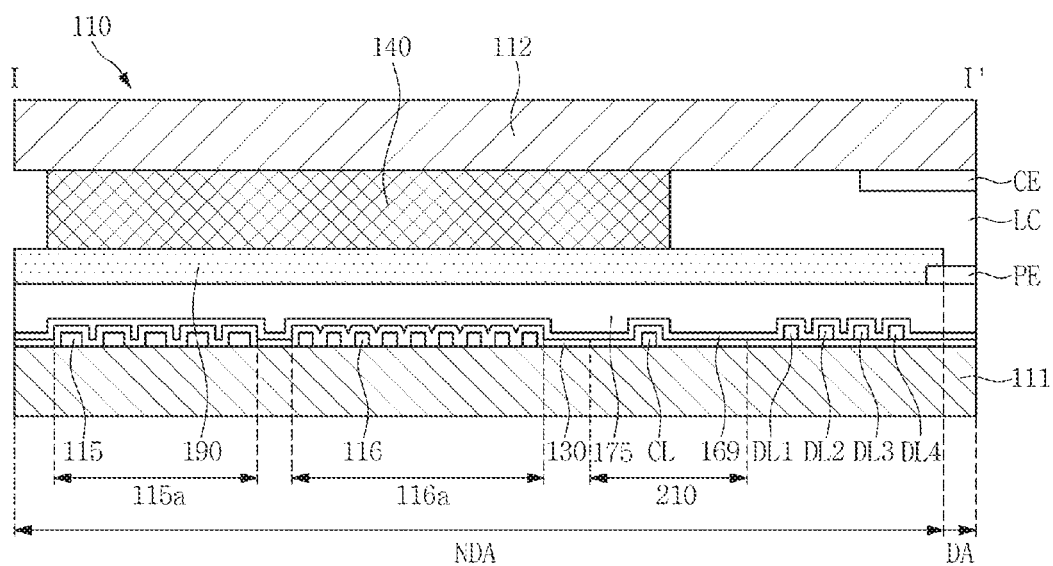
FIG. 5 is a cross-sectional view taken along line I-I' of FIG. 3.

The plurality of common voltage wirings 115 are electrically connected to a common electrode CE (refer to FIG. 5).

The gate link unit 116a includes a plurality of signal lines 116 between the common voltage wiring unit 115a and the gate driver 210. In an exemplary embodiment, the gate link unit 116a includes a gate start signal line, a plurality of clock signal lines, a forward signal line, a reverse signal line, a reset signal line, and a base voltage line, for example. An end of each of the plurality of signal lines 116 of the gate link unit 116a is connected to the timing controller 331 (refer to FIG. 1) or the gate control circuit 332 (refer to FIG. 1). In addition, another end of each of the plurality of signal lines 116 of the gate link unit 116a is connected in a selective manner to the gate driver 210 through a signal connecting wiring 116b.

The gate driver 210 is provided along with the TFT TR (refer to FIG. 6) of the pixel PX (refer to FIG. 1). As such, a structure in which the gate driver 210 is disposed on the same substrate as a substrate on which the TFT TR of the pixel PX is disposed may also be referred to as an amorphous silicon gate ("ASG") structure.

The gate driver 210 generates the gate signal based on a gate start signal, a clock signal, a forward signal, a reverse signal, a reset signal, and a base voltage applied from the gate link unit 116a and applies the gate signal to the gate line GL. To this end, the gate driver 210 includes the plurality of stages ST1, ST2, . . . , each of which is connected to the gate line GL. Each of the plurality of stages ST1, ST2, . . . applies the gate signal to the gate line GL. In addition, adjacent ones of the stages ST1, ST2, . . . are connected to one another by a carry line CL that transmits a carry signal.

In an exemplary embodiment, each of the plurality of stages ST1, ST2, . . . applies the gate signal, which is a clock signal applied from one of the plurality of clock signal lines, to the gate line GL in response to the gate start signal applied from the gate start signal line or a pervious stage, for example. The gate line GL is connected to the gate driver 210 and applies the gate signal to the pixel PX.

Referring to FIG. 3, the pixels PX are disposed in a step-like shape in at least one corner of the first substrate 111. The gate driver 210 includes, in at least one corner of the first substrate 111, the plurality of stages ST1, ST2, and ST3 that are disposed in a step-like shape corresponding to the pixels PX.

As the plurality of stages ST1, ST2, and ST3 are disposed in a step-like shape in the corner of the first substrate 111 corresponding to disposition of the pixels PX, an unnecessary expansion of a disposition area of the plurality of stages ST1, ST2, and ST3 is prevented. Accordingly, a disposition area of the stage ST and the gate driver 210 may be significantly reduced (e.g., minimized), and a planar area of the non-display area NDA may also be significantly reduced (e.g., minimized).

In an exemplary embodiment, the first stage ST1 further protrudes in an extension direction (e.g., toward the right side in FIG. 3) of the gate line GL than the second stage ST2 does, for example. Similarly, the second stage ST2 further protrudes in the extension direction of the gate line GL than the third stage ST3 does, for example.

In the case that planar areas of respective ones of the pixels PX are substantially the same, a second pixel row connected to the second gate line GL2 includes more pixels than pixels included in a first pixel row connected to the first gate line GL1.

The data lines DL are disposed between an area in which the stages ST1, ST2, ST3, and ST4 are disposed and an area in which the pixels PX are disposed. Referring to FIG. 3, the data lines DL1, DL2, and DL3 extend in a step-like shape among the first, second, and third stages ST1, ST2, and ST3 and the pixels PX. However, the invention is not limited thereto, and in another exemplary embodiment, the data line DL may extend diagonally or may have a curved shape among the first, second, third, and fourth stages ST1, ST2, ST3, and ST4 and the pixels PX.

According to the exemplary embodiment, the plurality of pixels PX is disposed along the gate line GL based on a pixel unit PXu. In an exemplary embodiment, a single pixel unit PXu includes a red pixel PX1, a green pixel PX2, and a blue pixel PX3, for example. In the exemplary embodiment, the single pixel unit PXu may further include a white pixel (not illustrated). However, the invention is not limited thereto, and the single pixel unit PXu may include various other color pixels. Referring to FIG. 3, the red pixel PX1, the green pixel PX2, and the blue pixel PX3 that are disposed in a row along a single gate line GL form a single pixel unit PXu.

In the case that the pixels PX in a certain area may not form the pixel unit PXu that includes the red pixel PX1, the green pixel PX2, and the blue pixel PX3, a color break phenomenon may occur whereby color is not suitably represented in the certain area. However, in the exemplary embodiment of the LCD device 10, pixels PX are disposed based on the pixel unit PXu such that the color break phenomenon may be significantly reduced or prevented.

Referring to FIG. 3, in an upper left portion of the first substrate 111, the second pixel row connected to the second gate line GL2 further protrudes in an extension direction (e.g., toward the left side in FIG. 3) of the gate line GL than the first pixel row connected to the first gate line GL1 does, for example. In addition, in the upper left portion of the first substrate 111, the second pixel row includes at least one more pixel unit PXu than pixel units included in the first pixel row.

In an exemplary embodiment, although not illustrated in FIG. 3, each of the pixel rows may include pixels PX disposed in an upper right portion of the first substrate 111 in a symmetric manner with respect to the pixels PX in the upper left portion of the first substrate 111. Accordingly, the second pixel row connected to the second gate line GL2 may include two more pixel units PXu than pixel units included in the first pixel row connected to the first gate line GL1.

In an alternative exemplary embodiment, however, each of the pixel rows may include pixels PX disposed in the upper right portion of the first substrate 111 in a dissymmetric manner with respect to the pixels PX in the upper left portion of the first substrate 111.

In addition, each of the pixel rows may include pixels PX disposed in a lower portion of the first substrate 111 in a symmetric manner with respect to the pixels PX in the upper portion of the first substrate 111.

Figure 4:
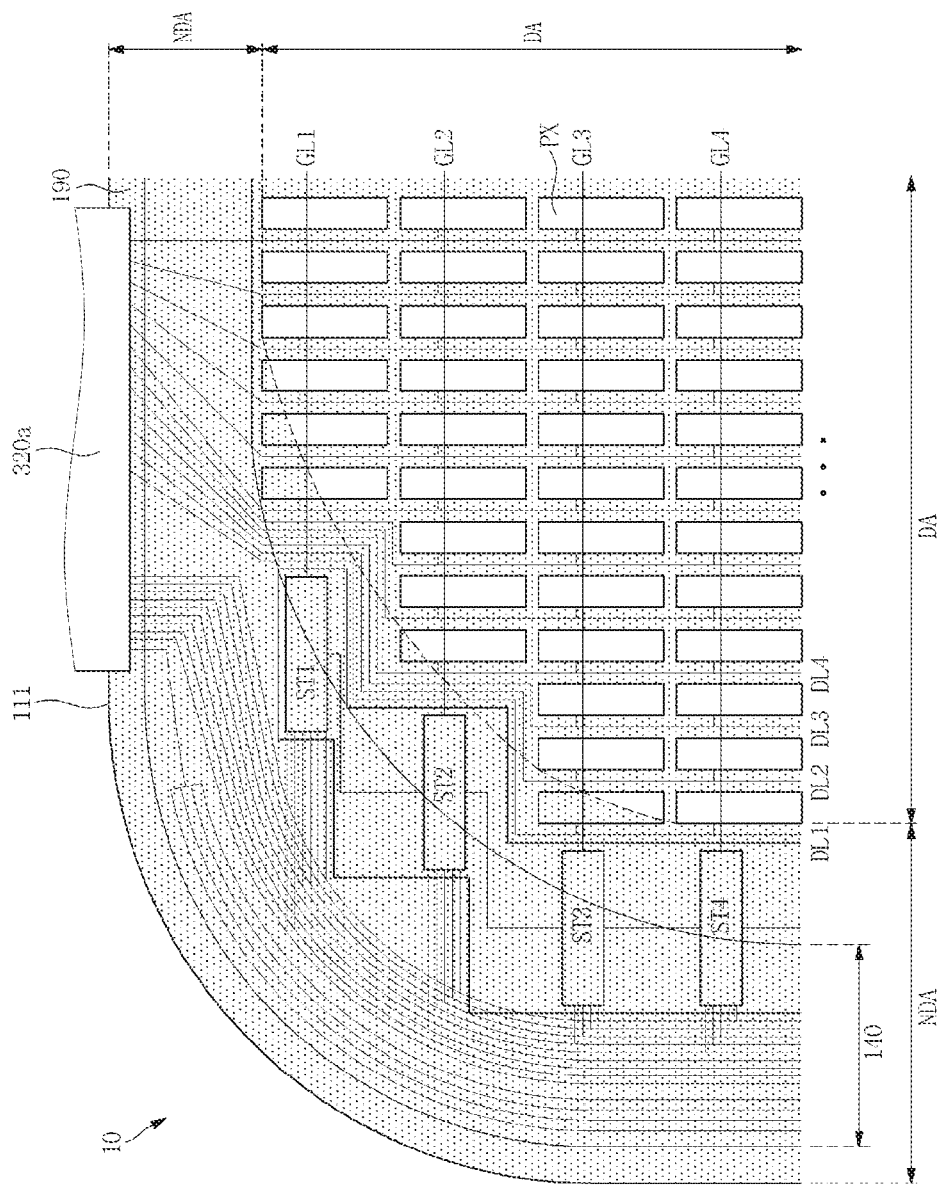
FIG. 4 is a plan view illustrating disposition of a light blocking unit.

FIG. 4 is a plan view illustrating disposition of a light blocking unit 190, and FIG. 5 is a cross-sectional view taken along line I-I' of FIG. 3.

Referring to FIG. 4, the light blocking unit 190 defines a border line between the display area DA and the non-display area NDA in a plan view, and includes a rounded corner corresponding to the at least one corner of the first substrate 111. In addition, the light blocking unit 190 may further include a black matrix that defines a pixel area in the display area DA. The black matrix is represented by a dot in FIG. 4. The light blocking unit 190 blocks light output from a backlight unit (not illustrated) and blocks external light irradiated to the gate line GL, the data line DL, or the TFT TR.

In an exemplary embodiment, the light blocking unit 190 may overlap the pixel PX in an outer portion of the display area DA.

That is, referring to FIGS. 4 and 5, in the corner of the display area DA, the light blocking unit 190 overlaps a part of the pixels PX connected to the first gate line GL1, a part of the pixels PX connected to the second gate line GL2, and a part of the pixels PX connected to the third gate line GL3. Accordingly, the exemplary embodiment of the LCD device 10 may have a display screen that includes a rounded corner.

In the case that the light blocking unit 190 overlaps a part of the pixels PX, an aperture ratio of the corresponding one of the pixels PX is reduced such that color break may occur. In such an example, a gray level of the pixels PX covered by the light blocking unit 190 may be adjusted, and a gray level of an adjacent one of the pixels PX may also be adjusted.

The exemplary embodiment of the LCD device 10 includes a sealing unit 140 which seals the first substrate 111 and the second substrate 112. The sealing unit 140 is disposed to overlap the light blocking unit 190, and overlaps a portion of the stage ST of the gate driver 210. The sealing unit 140 may be manufactured in a method that is typically employed in the pertinent art using a material that is typically used in the pertinent art.

Referring to FIG. 5, the common voltage wiring unit 115a and the gate link unit 116a are disposed on the first substrate 111, and a gate insulating layer 130, an insulating interlayer 169, and a passivation layer 175 are disposed thereon. In addition, the carry line CL that connects the stages ST to one another is also disposed on the same layer as a layer on which the common voltage wiring unit 115a and the gate link unit 116a are disposed.

Hereinabove, a configuration of the pixel PX according to the exemplary embodiment will be described in further detail with reference to FIGS. 6 and 7.

Figure 6:
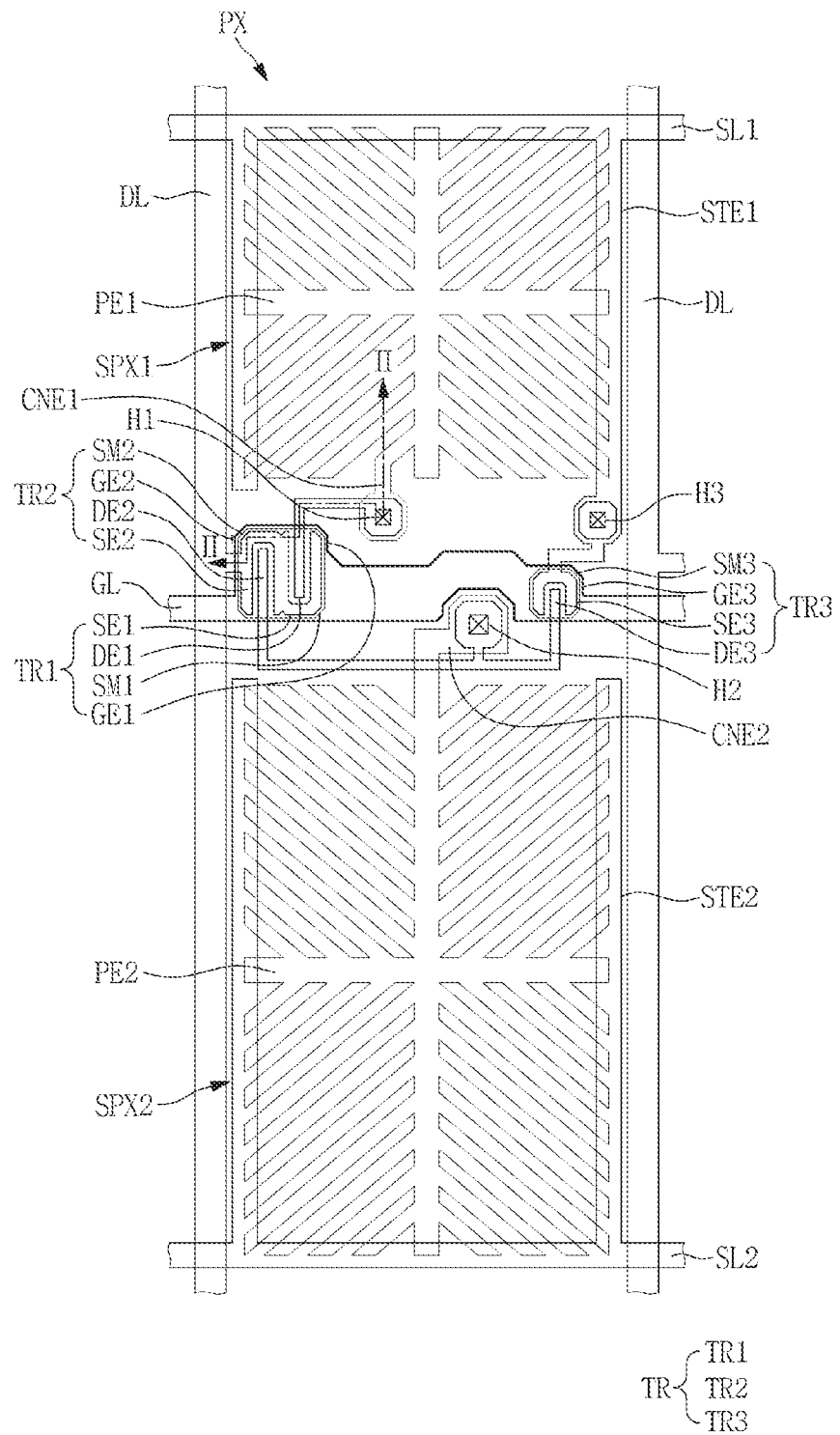
FIG. 6 is a plan view illustrating one of pixels of FIG. 3.
Figure 7:
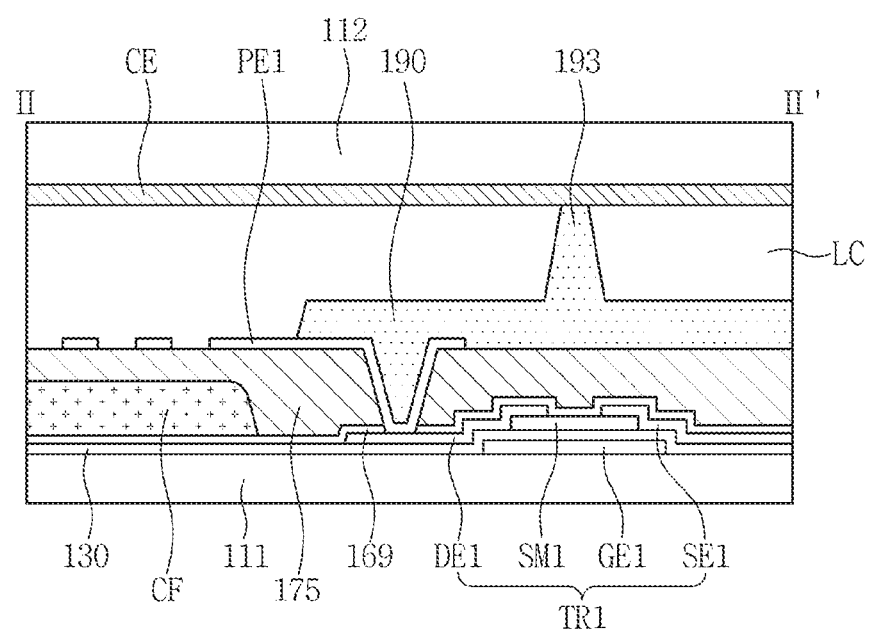
FIG. 7 is a cross-sectional view taken along line II-IP of FIG. 6.

FIG. 6 is a plan view illustrating one of the pixels PX of FIG. 3, and FIG. 7 is a cross-sectional view taken along line II-IP of FIG. 6. The pixel PX is connected to the gate line GL and the data line DL.

Referring to FIG. 6, the pixel PX according to the exemplary embodiment includes a first sub-pixel SPX1 and a second sub-pixel SPX2. The first sub-pixel SPX1 includes a first TFT TR1, a first pixel electrode PE1, and a first storage electrode STE1. The second sub-pixel SPX2 includes a second TFT TR2, a second pixel electrode PE2, a second storage electrode STE2, and a third TFT TR3.

The first sub-pixel SPX1 may also be referred to as a high pixel, and the second sub-pixel SPX2 may also be referred to as a low pixel.

The first TFT TR1 of the first sub-pixel SPX1 includes a first gate electrode GE1 branching from the gate line GL, a first semiconductor layer SM1 disposed to overlap the first gate electrode GE1, a first source electrode SE1 branching from the data line DL and overlapping the first semiconductor layer SM1, and a first drain electrode DE1 spaced apart from the first source electrode SE1 and overlapping the first semiconductor layer SM1. The first drain electrode DE1 is connected to the first pixel electrode PE1. In an exemplary embodiment, the first drain electrode DE1 extends toward the first pixel electrode PE1 and is electrically connected to a first connecting electrode CNE1, which branches from the first pixel electrode PE1, through the first contact hole H1, for example.

The first storage electrode STE1 is connected to the first storage line SL1. The first pixel electrode PE1 overlaps portions of the first storage line SL1 and the first storage electrode STE1 to provide a first storage capacitor. The first storage electrode SET1 receives a storage voltage.

The second TFT TR2 of the second sub-pixel SPX2 includes a second gate electrode GE2 branching from the gate line GL, a second semiconductor layer SM2 overlapping the second gate electrode GE2, a second source electrode SE2 branching from the data line DL and overlapping the second semiconductor layer SM2, and a second drain electrode DE2 spaced apart from the second source electrode SE2 and overlapping the second semiconductor layer SM2. The second drain electrode DE2 is connected to the second pixel electrode PE2. In an exemplary embodiment, the second drain electrode DE2 extends toward the second pixel electrode PE2 and is electrically connected to a second connecting electrode CNE2, which branches from the second pixel electrode PE2, through a second contact hole H2, for example.

The third TFT TR3 of the second sub-pixel SPX2 includes a third gate electrode GE3 branching from the gate line GL, a third source electrode SE3 electrically connected to the first storage electrode STE1 through a third contact hole H3, a third drain electrode DE3 extending from the second drain electrode DE2, and a third semiconductor layer SM3. The third source electrode SE3 and the first storage electrode STE1 are electrically connected to each other through the third contact hole H3. In addition, the third drain electrode DE3 is electrically connected to the second pixel electrode PE2 through the second contact hole H2.

The second storage electrode STE2 is connected to the second storage line SL2. The second pixel electrode PE2 overlaps portions of the second storage line SL2 and the second storage electrode STE2 to provide a second storage capacitor. The second storage electrode STE2 receives the storage voltage.

Referring to FIGS. 6 and 7, the gate line GL, the first, second, and third gate electrodes GE1, GE2, and GE3 branching from the gate line GL, the first storage line SL1, the first storage electrode STE1, the second storage line SL2, and the second storage electrode STE2 are disposed on the first substrate 111.

The gate insulating layer 130 is disposed on the first substrate 111 to cover the gate line GL, the first, second, and third gate electrodes GE1, GE2, and GE3, the first and second storage lines SL1 and SL2, and the first and second storage electrodes STE1 and STE2.

The gate insulating layer 130 is also disposed on the common voltage wiring unit 115a (refer to FIG. 3), the gate link unit 116a (refer to FIG. 3), and the carry line CL (refer to FIG. 3).

The first, second, and third semiconductor layers SM1, SM2, and SM3 are disposed on the gate insulating layer 130. In an exemplary embodiment, the first, second, and third semiconductor layers SM1, SM2, and SM3 may include or consist of amorphous silicon or an oxide semiconductor including at least one of gallium (Ga), indium (In), tin (Sn), and zinc (Zn), for example. Although not illustrated, an ohmic contact layer may be disposed on the first, second, and third semiconductor layers SM1, SM2, and SM3.

The data line DL extends in a longitudinal direction to be disposed on the gate insulating layer 130. The first, second, and third source electrodes SE1, SE2, and SE3 are disposed to overlap the first, second, and third semiconductor layers SM1, SM2, and SM3, respectively, and the first, second, and third drain electrodes DE1, DE2, and DE3 are disposed to overlap the first, second, and third semiconductor layers SM1, SM2, and SM3, respectively, and thus the first, second, and third thin film transistors TR1, TR2, and TR3 are formed.

The third source electrode SE3 of the third TFT TR3 is electrically connected to the first storage electrode STE1 through the third contact hole H3 which is defined through the gate insulating layer 130.

The insulating interlayer 169 is disposed to cover the data line DL and the first, second, and third thin film transistors TR1, TR2, and TR3. The insulating interlayer 169 covers upper portions of the first, second, and third semiconductor layers SM1, SM2, and SM3. The insulating interlayer 169 may have a monolayer or a multilayer structure including silicon oxide, silicon nitride, and/or a photosensitive organic or silicon-based low dielectric constant insulating material, for example.

A color filter CF is disposed on the insulating interlayer 169.

The color filter CF is disposed to overlap the first and second pixel electrodes PE1 and PE2 and imparts color to light that is transmitted through the pixel. In an exemplary embodiment, the color filter CF may be one of a red color filter, a green color filter, and a blue color filter, for example. In an alternative exemplary embodiment, the color filter CF may be a white color filter. However, the invention is not limited thereto, and the color filter CF may include various other color filters.

The passivation layer 175 is disposed on the insulating interlayer 169 and the color filter CF. The passivation layer 175 may have a monolayer or a multilayer structure including silicon oxide, silicon nitride, and/or a photosensitive organic or silicon-based low dielectric constant insulating material, for example.

The passivation layer 175 serves to planarize upper portions of the first, second, and third thin film transistors TR1, TR2, and TR3, and the color filters CF. Thus, the passivation layer 175 may also be referred to as a planarization layer.

Portions of the insulating interlayer 169 and the passivation layer 175 are removed such that the first contact hole H1 exposing a portion of the first drain electrode DE1 and the second contact hole H2 exposing a portion of the second drain electrode DE2 are defined.

The first pixel electrode PE1 and the second pixel electrode PE2 are disposed on the passivation layer 175. The first pixel electrode PE1 is electrically connected to the first drain electrode DE1 through the first contact hole H1. The second pixel electrode PE2 is electrically connected to the second drain electrode DE2 through the second contact hole H2.

Referring to FIG. 6, each of the first and second pixel electrodes PE1 and PE2 includes a stem portion having a cross shape and a plurality of branch portions extending from the stem portion. In an exemplary embodiment, the first and second pixel electrodes PE1 and PE2 may include or consist of a transparent conductive material such as indium tin oxide ("ITO"), indium zinc oxide ("IZO"), indium tin zinc oxide ("ITZO"), aluminum zinc oxide ("AZO"), and the like.

Referring to FIG. 7, the light blocking unit 190 is disposed on the passivation layer 175, and the column spacer 193 is disposed on the light blocking unit 190. According to the exemplary embodiment, the light blocking unit 190 and the column spacer 193 are simultaneously formed in the same process. The light blocking unit 190 and the column spacer 193 are also referred to as a black column spacer ("BCS"). In addition, a structure in which the light blocking unit 190 and the first, second, and third thin film transistors TR1, TR2, and TR3 are disposed on the same substrate may also be referred to as a black matrix on array ("BOA") structure.

Although not illustrated, a lower alignment layer may be disposed on the first and second pixel electrodes PE1 and PE2 and the light blocking unit 190. In an exemplary embodiment, the lower alignment layer may be a homeotropic alignment layer, and may include a photosensitive material, for example.

In an exemplary embodiment, the second substrate 112 is an insulating substrate including a transparent material such as glass or plastic.

The common electrode CE is disposed on the second substrate 112. In an exemplary embodiment, the common electrode CE may include or consist of transparent conductive oxide ("TCO") such as ITO, IZO, and AZO, for example.

Although not illustrated, an upper alignment layer may be disposed on the common electrode CE. The upper alignment layer may include or consist of a material included in the aforementioned lower alignment layer.

In the case that a surface of the first substrate 111 and a surface of the second substrate 112 that face each other are defined as upper surfaces of the corresponding substrate, respectively, and surfaces opposite to the upper surfaces are defined as lower surfaces of the corresponding substrate, respectively, polarizers may be disposed on the lower surface of the first substrate 111 and the lower surface of the second substrate 112, respectively.

The liquid crystal layer LC is disposed in a space, between the first substrate 111 and the second substrate 112, which is secured by the column spacer 193.

The liquid crystal layer LC may include liquid crystal molecules. In an exemplary embodiment, the liquid crystal molecules of the liquid crystal layer LC may have a structure in which a major axis thereof is aligned parallel to one of the first substrate 111 and the second substrate 112, and the direction is spirally twisted about 90 degrees from a rubbing direction of the alignment layer of the first substrate 111 to the second substrate 112, for example. In an alternative exemplary embodiment, the liquid crystal layer LC may include homeotropic liquid crystal molecules.

Hereinafter, an exemplary embodiment will be described with reference to FIGS. 8 and 9.

Figure 8:
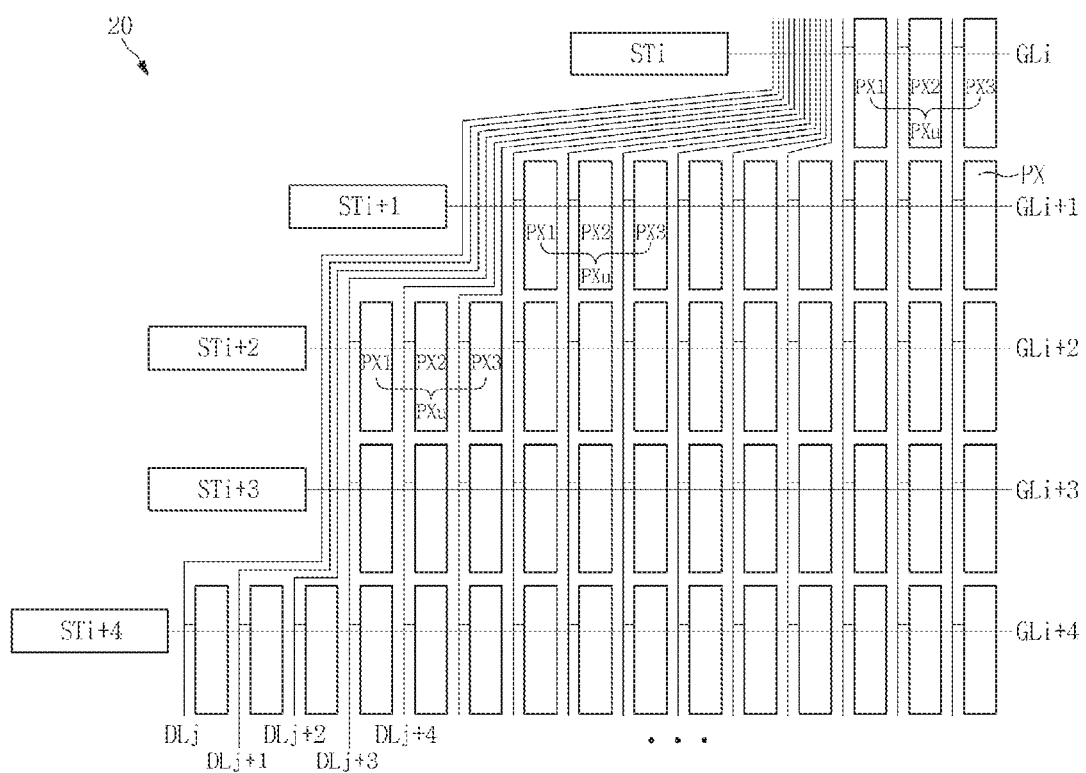
FIGS. 8 and 9 are plan views illustrating disposition of pixels of an exemplary embodiment of the display device.
Figure 9:
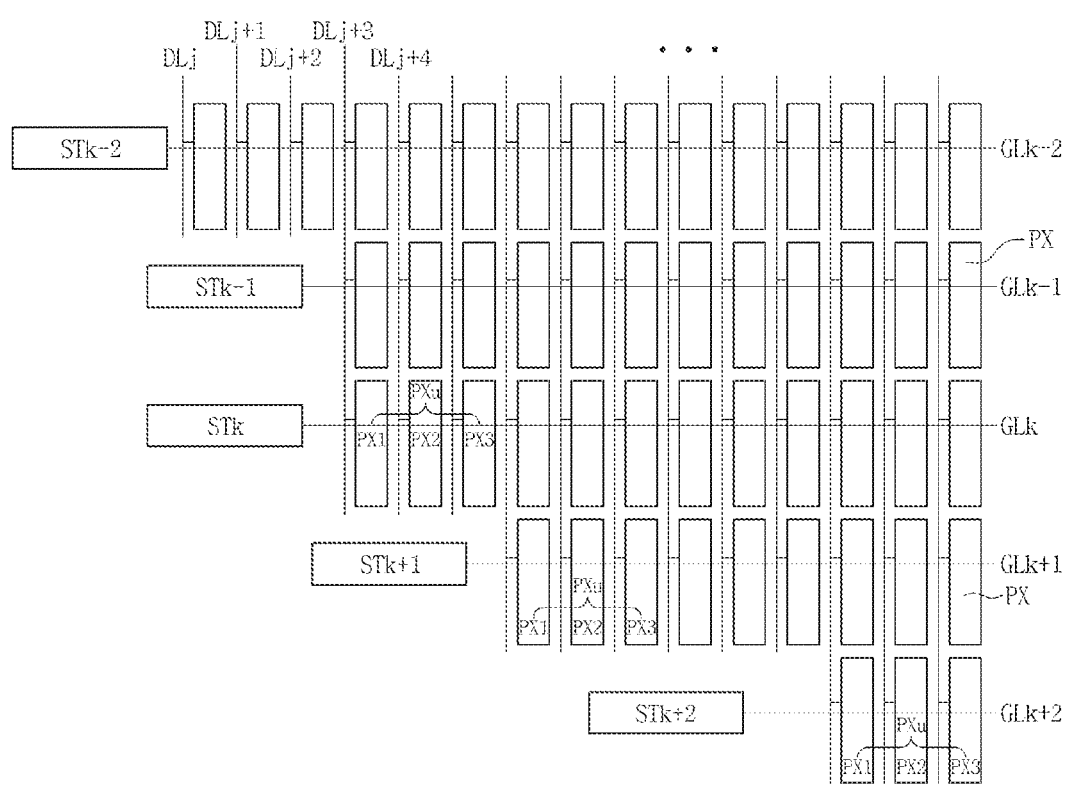

FIGS. 8 and 9 are plan views illustrating disposition of pixels PX of the exemplary embodiment of the display device. The exemplary embodiment of the display device is an LCD device 20. However, the scope of the exemplary embodiment is not limited to the LCD device. In an exemplary embodiment, the exemplary embodiment may be applied to an OLED device. Hereinafter, descriptions pertaining to configurations described hereinabove will be omitted to avoid repetition.

FIG. 8 is a plan view illustrating disposition of pixels PX in an upper left portion of the exemplary embodiment of the LCD device 20.

Referring to FIG. 8, a gate driver 210 includes, in a corner of a first substrate 111, an $i^{th}$ stage STi, an $i+1^{th}$ stage STi+1, and an $i+2^{th}$ stage STi+2 that are disposed in a step-like shape corresponding to the pixels PX. Herein, i is a natural number.

The $i+1^{th}$ stage STi+1 is disposed adjacent to the $i^{th}$ stages STi, and the $i^{th}$ stage STi further protrudes in an extension direction of a gate line than the $i+1^{th}$ stages STi+1 does, for example.

Each of pixel rows respectively connected to the gate lines may include pixels PX disposed in an upper right portion of the first substrate 111 in a symmetric manner or in a dissymmetric manner with respect to pixels PX in an upper left portion of the first substrate 111. In addition, each of pixel rows in a lower portion of the first substrate 111 may include pixels PX disposed in a symmetric manner with respect to pixels PX in an upper portion of the first substrate 111.

In an exemplary embodiment, an $i^{th}$ gate line GLi extends from the $i^{th}$ stage STi to be connected to an $i^{th}$ pixel row, and an $i+1^{th}$ gate line GLi+1 extends from the $i+1^{th}$ stage STi+1 to be connected to an $i+1^{th}$ pixel row, for example.

Referring to FIG. 8, the $i+1^{th}$ pixel row includes two more pixel units PXu than pixel units included in the $i^{th}$ pixel row in the upper left portion of the first substrate 111.

In addition, an $i+2^{th}$ pixel row includes one more pixel unit PXu than the pixel units included in the $i+1^{th}$ pixel row in the upper left portion of the first substrate 111.

Although not illustrated in FIG. 8, each of the pixel rows may include pixels PX disposed in the upper right portion of the first substrate 111 in a symmetric manner with respect to the pixels PX in the upper left portion of the first substrate 111. That is, each of the pixel rows of the exemplary embodiment of the LCD device 20 may include pixels PX that are disposed in a horizontally symmetric manner. Accordingly, in the upper portion of the first substrate 111, the $i+1^{th}$ pixel row includes four more pixel units PXu than the pixel units included in the $i^{th}$ pixel row, and the $i+2^{th}$ pixel row includes two more pixel units PXu than the pixel units included in the $i+1^{th}$ pixel row.

In addition, an $i+3^{th}$ pixel row that is connected to an $i+3^{th}$ stage STi+3 and an $i+3^{th}$ gate line GLi+3 have the same number of pixel units PXu as that of pixel units included in the $i+2^{th}$ pixel row.

An $i+4^{th}$ pixel row that is connected to an $i+4^{th}$ stage STi+4 and an $i+4^{th}$ gate line GLi+4 includes one more pixel unit PXu than the pixel units included in the $i+3^{th}$ pixel row in the upper left portion of the first substrate 111.

However, the invention is not limited thereto, and each of the pixel rows included in another exemplary embodiment of the LCD device 20 may include pixels PX that are disposed in a horizontally dissymmetric manner.

FIG. 9 is a plan view illustrating disposition of pixels PX in a lower left portion of the exemplary embodiment of the LCD device 20. The pixels PX of FIG. 9 are disposed in a vertically symmetric manner with respect to the pixels PX illustrated in FIG. 8.

Referring to FIG. 9, a gate driver 210 includes a $k^{th}$ stage STk and a $k+1^{th}$ stage STk+1 disposed adjacent to the $k^{th}$ stage STk in at least one corner of a first substrate 111. The $k+1^{th}$ stage STk+1 further protrudes in an extension direction of a gate line GL than the $k^{th}$ stage STk does, for example. Herein, k is a natural number.

A $k^{th}$ pixel row that is connected to the $k^{th}$ stage STk and a $k^{th}$ gate line GLk includes, in the lower left portion of the first substrate 111, one more pixel unit PXu than pixel units included in a $k+1^{th}$ pixel row that is connected to the $k+1^{th}$ stage STk and a $k+1^{th}$ gate line GLk+1. In the case that each of the pixel rows in a lower portion of the first substrate 111 includes pixels PX that are disposed in a horizontally symmetric manner, the $k^{th}$ pixel row includes two more pixel units PXu than the pixel units included in the $k+1^{th}$ pixel row in the lower portion of the first substrate 111.

In the lower left portion of the first substrate 111, the $k+1^{th}$ pixel row includes two more pixel units PXu than pixel units included in a $k+2^{th}$ pixel row that is connected to a $k+2^{th}$ stage STk+2 and a $k+2^{th}$ gate line GLk+2.

A $k-1^{th}$ pixel row that is connected to a $k-1^{th}$ stage STk-1 and a $k-1^{th}$ gate line GLk-1 includes the same number of pixel units PXu as the number of pixel units included in the $k^{th}$ pixel row.

A $k-2^{th}$ pixel row that is connected to a $k-2^{th}$ stage STk-2 and a $k-2^{th}$ gate line GLk-2 includes one more pixel unit PXu than the pixel units included in the $k-1^{th}$ pixel row in the lower left portion of the first substrate 111.

Hereinafter, an exemplary embodiment will be described with reference to FIG. 10.

Figure 10:
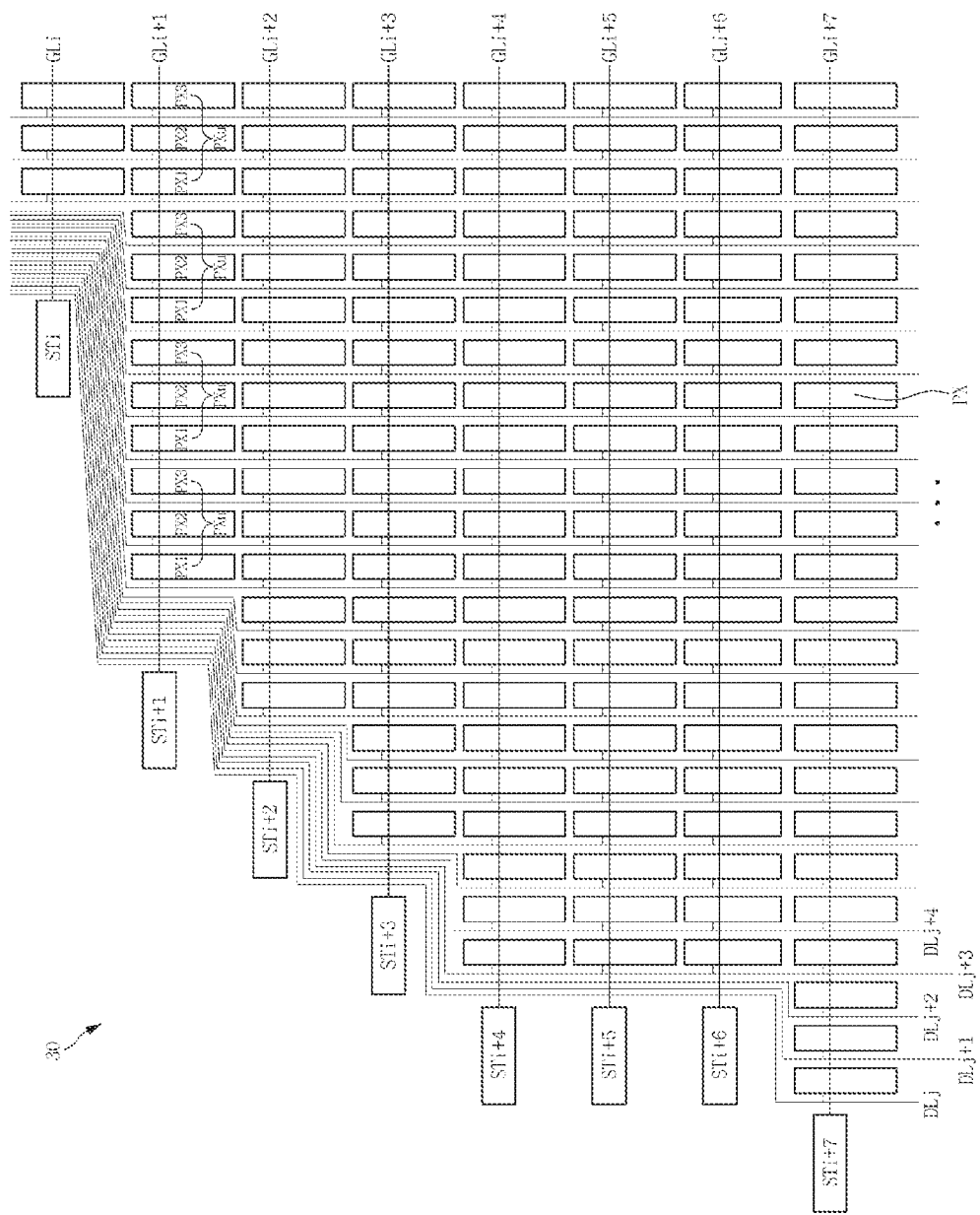
FIG. 10 is a plan view illustrating disposition of pixels of an exemplary embodiment of the display device.

FIG. 10 is a plan view illustrating disposition of pixels PX of an exemplary embodiment of the display device. The exemplary embodiment of the display device is an LCD device 30.

According to the exemplary embodiment, an $i+1^{th}$ pixel row includes three more pixel units PXu than pixel units included in an $i^{th}$ pixel row in an upper left portion of the first substrate 111. That is, referring to FIG. 10, the $i+1^{th}$ pixel row includes nine more pixels PX than pixels included in the $i^{th}$ pixel row in the upper left portion of the first substrate 111.

An $i+2^{th}$ pixel row includes one more pixel unit PXu than the pixel units included in the $i+1^{th}$ pixel row in the upper left portion of the first substrate 111. An $i+3^{th}$ pixel row includes one more pixel unit PXu than the pixel units included in the $i+2^{th}$ pixel row in the upper left portion of the first substrate 111. An $i+4^{th}$ pixel row includes one more pixel unit PXu than the pixel units included in the $i+3^{th}$ pixel row in the upper left portion of the first substrate 111.

The $i+4^{th}$ pixel row, an $i+5^{th}$ pixel row, and an $i+6^{th}$ pixel row include the same number of pixel units PXu as one another.

An $i+7^{th}$ pixel row includes one more pixel unit PXu than the pixel units included in the i+6th pixel row in the upper left portion of the first substrate 111.

Each of the pixel rows in the exemplary embodiment of the LCD device 30 may include pixels PX disposed in an upper right portion of the first substrate 111 in a symmetric manner or in a dissymmetric manner with respect to the pixels in the upper left portion of the first substrate 111. Further, the exemplary embodiment of the LCD device 30 may include a pixel row disposed in a lower portion of the first substrate 111 in a symmetric manner or in a dissymmetric manner with respect to the pixel row in the upper portion of the first substrate 111.

Hereinafter, an exemplary embodiment will be described with reference to FIG. 11.

Figure 11:
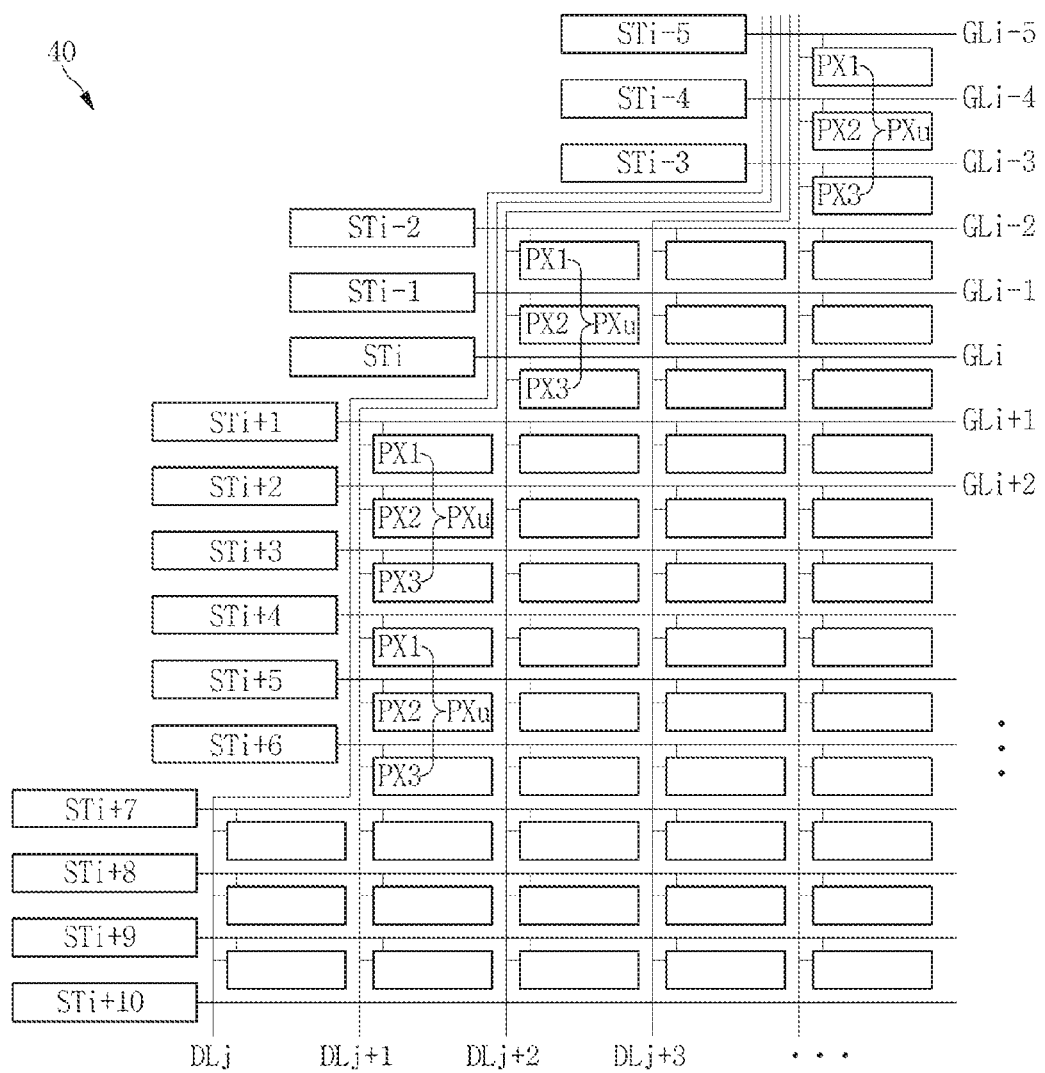
FIG. 11 is a plan view illustrating disposition of pixels of an exemplary embodiment of the display device.

FIG. 11 is a plan view illustrating disposition of pixels PX of an exemplary embodiment of the display device. The exemplary embodiment of the display device is an LCD device 40.

According to the exemplary embodiment, a plurality of pixels PX is disposed along the data line DL based on a pixel unit PXu. In an exemplary embodiment, a pixel unit PXu includes a red pixel PX1, a green pixel PX2, and a blue pixel PX3, for example. In the exemplary embodiment, the pixel unit PXu may further include a white pixel (not illustrated). However, the invention is not limited thereto, and the single pixel unit PXu may include various other color pixels.

Referring to FIG. 11, a $j+1^{th}$ pixel column connected to a $j+1^{th}$ data line DLj+1 includes two more pixel units PXu than pixel units included in a $j^{th}$ pixel column connected to $j^{th}$ data line DLj in an upper left portion of the first substrate 111. A $j+2^{th}$ pixel column connected to a $j+2^{th}$ data line DLj+2 includes one more pixel unit PXu than the pixel units included in the $j+1^{th}$ pixel column in the upper left portion of the first substrate 111.

In addition, referring to FIG. 11, an i+1$^{th}$ pixel row connected to an i+1$^{th}$ stage STi+1 and an i+1$^{th}$ gate line GLi+1 includes one more pixel PX than pixels included in an i$^{th}$ pixel row connected to an i$^{th}$ stage STi and an i$^{th}$ gate line GLi in the upper left portion of the first substrate 111.

According to the exemplary embodiment, each of the pixel rows may include pixels PX that are disposed on the first substrate 111 in a horizontally symmetric manner. In such an exemplary embodiment, the i+1$^{th}$ pixel row includes two more pixels PX than the pixels included in the i$^{th}$ pixel row.

Hereinafter, an exemplary embodiment will be described with reference to FIGS. 12, 13, and 14.

Figure 12:
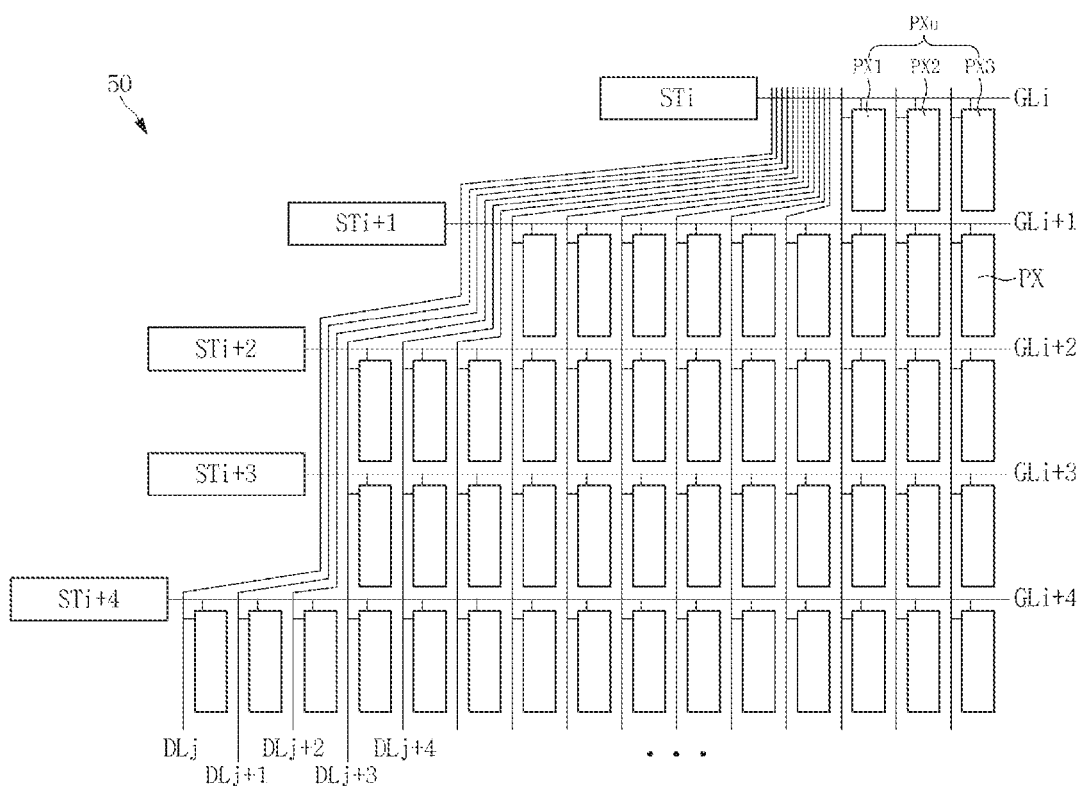
FIG. 12 is a plan view illustrating disposition of pixels of an exemplary embodiment of the display device.

FIG. 12 is a plan view illustrating disposition of pixels PX of an exemplary embodiment of the display device. The exemplary embodiment of the display device is an LCD device 50.

Referring to FIG. 12, the exemplary embodiment of the LCD device 50 includes a gate line GL (refer to FIG. 1) including an i$^{th}$ gate line GLi to an i+4th gate line GLi+4, for example, on the pixel PX.

Figure 13:
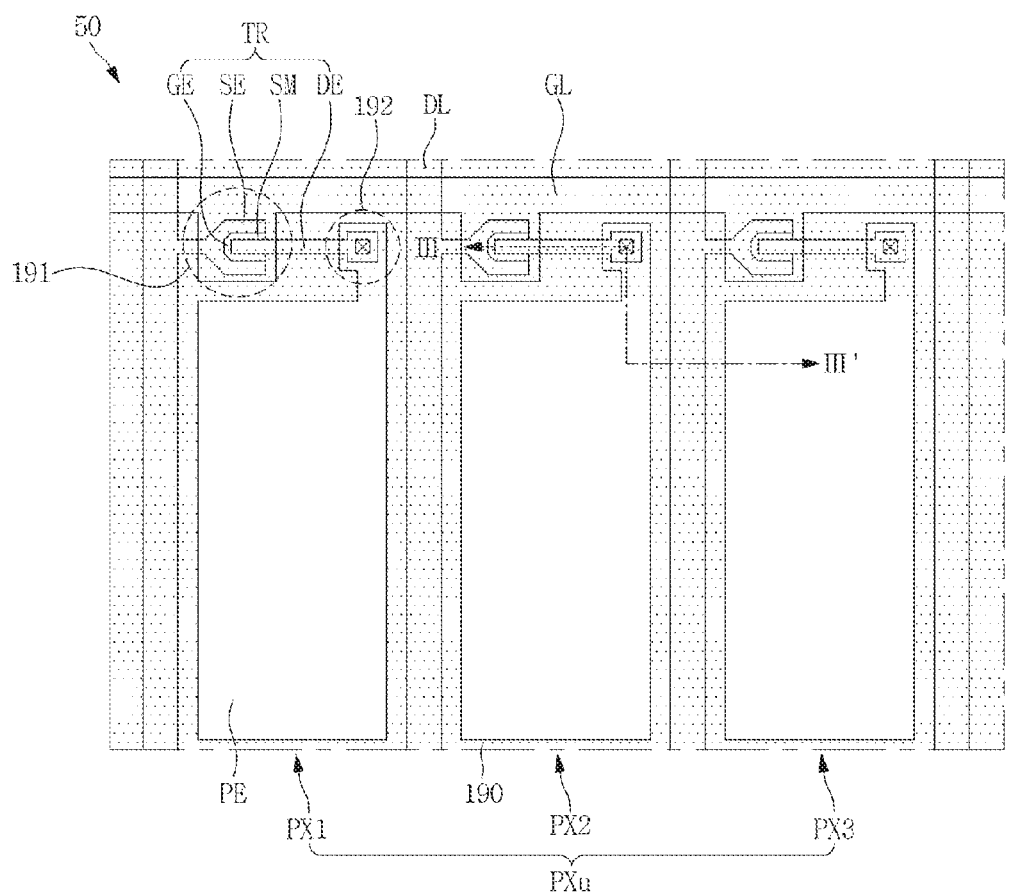
FIG. 13 is a plan view illustrating one of pixel units of FIG. 12.
Figure 14:
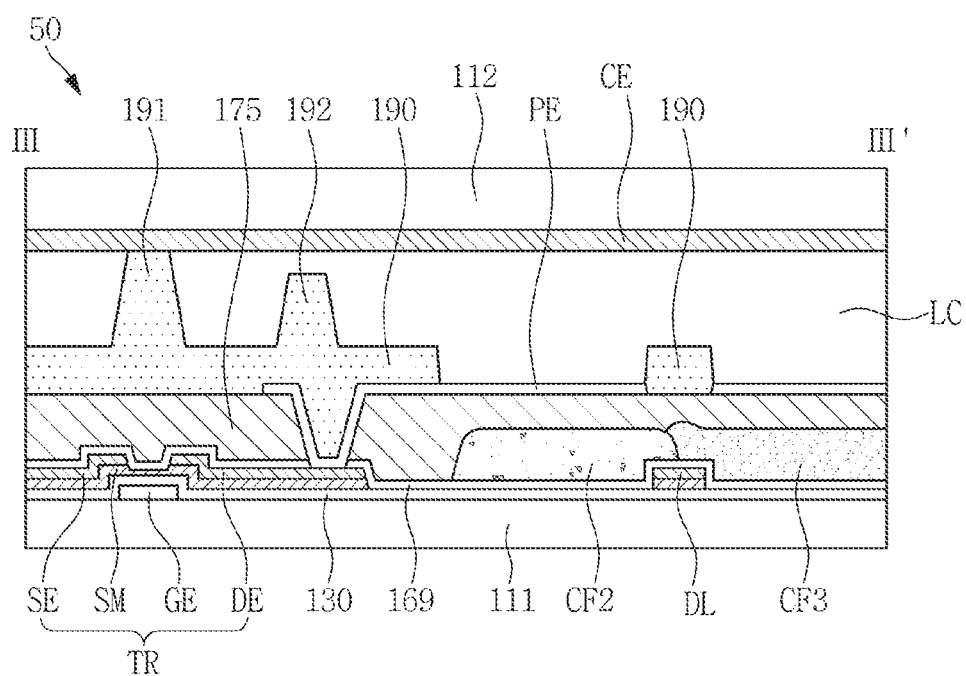
FIG. 14 is a cross-sectional view taken along line of FIG. 13.

FIG. 13 is a plan view illustrating one of pixel units PXu of FIG. 12, and FIG. 14 is a cross-sectional view taken along line of FIG. 13.

Referring to FIGS. 13 and 14, three pixels PX1, PX2, and PX3 disposed in a row along the gate line GL forms one pixel unit PXu.

The exemplary embodiment of the LCD device 50 includes a first substrate 111, a second substrate 112 opposing the first substrate 111, and a liquid crystal layer LC between the first substrate 111 and the second substrate 112.

In an exemplary embodiment, the first substrate 111 is an insulating substrate including a transparent material such as glass or plastic.

The gate line GL that transmits a gate signal is disposed on the first substrate 111. A gate electrode GE protrudes from the gate line GL.

A gate insulating layer 130 is disposed on the first substrate 111, the gate line GL, and the gate electrode GE.

A semiconductor layer SM is disposed on the gate insulating layer 130 to define a channel of a TFT TR. At least a portion of the semiconductor layer SM overlaps the gate electrode GE.

A data line DL is disposed on the gate insulating layer 130.

A source electrode SE branches from the data line DL to extend onto the semiconductor layer SM. The drain electrode DE is spaced apart from the source electrode SE with respect to a channel area of the TFT TR to be disposed on the semiconductor layer SM.

The TFT TR is defined by the gate electrode GE, the source electrode SE, the drain electrode DE, and the semiconductor layer SM. As such, the TFT TR is connected to the gate line GL and the data line DL.

An insulating interlayer 169 is disposed on the TFT TR.

A first color filter (not illustrated), a second color filter CF2, and a third color filter CF3 are disposed on the insulating interlayer 169. In an exemplary embodiment, the first color filter (not illustrated) is a red color filter, the second color filter CF2 is a green color filter, and the third color filter CF3 is a blue color filter, for example. In the exemplary embodiment, the color filter may use a white color filter (not illustrated), for example. However, the invention is not limited thereto, and the first to third color filters may include various other color filters.

A passivation layer 175 is disposed on the insulating interlayer 169 and the second and third color filters CF2 and CF3. In an exemplary embodiment, the passivation layer 175 may have a monolayer or a multilayer structure including silicon oxide, silicon nitride, and/or a photosensitive organic or silicon-based low dielectric constant insulating material, for example.

Portions of the insulating interlayer 169 and the passivation layer 175 are removed such that a contact hole exposing a portion of the drain electrode DE is defined.

A pixel electrode PE is disposed on the passivation layer 175. The pixel electrode PE is electrically connected to the drain electrode DE through a contact hole.

A light blocking unit 190 is disposed on the passivation layer 175, and a main column spacer 191 and a sub-column spacer 192 are disposed on the light blocking unit 190.

The main column spacer 191 and the sub-column spacer 192 protrude from the light blocking unit 190. The main column spacer 191 and the sub-column spacer 192 have a height difference therebetween and are spaced apart from each other. With respect to a surface of the light blocking unit 190, the main column spacer 191 has a greater height than that of the sub-column spacer 192.

According to the exemplary embodiment, the light blocking unit 190, the main column spacer 191, and the sub-column spacer 192 have a BCS structure that is manufactured in the same process using the same material.

In an exemplary embodiment, a second substrate 112 is an insulating substrate including a transparent material such as glass or plastic.

A common electrode CE is disposed on the second substrate 112.

A liquid crystal layer LC is disposed between a space, between the first substrate 111 and the second substrate 112, which is secured by the main column spacer 191 and the sub-column spacer 192.

Hereinafter, an exemplary embodiment will be described with reference to FIG. 15.

Figure 15:
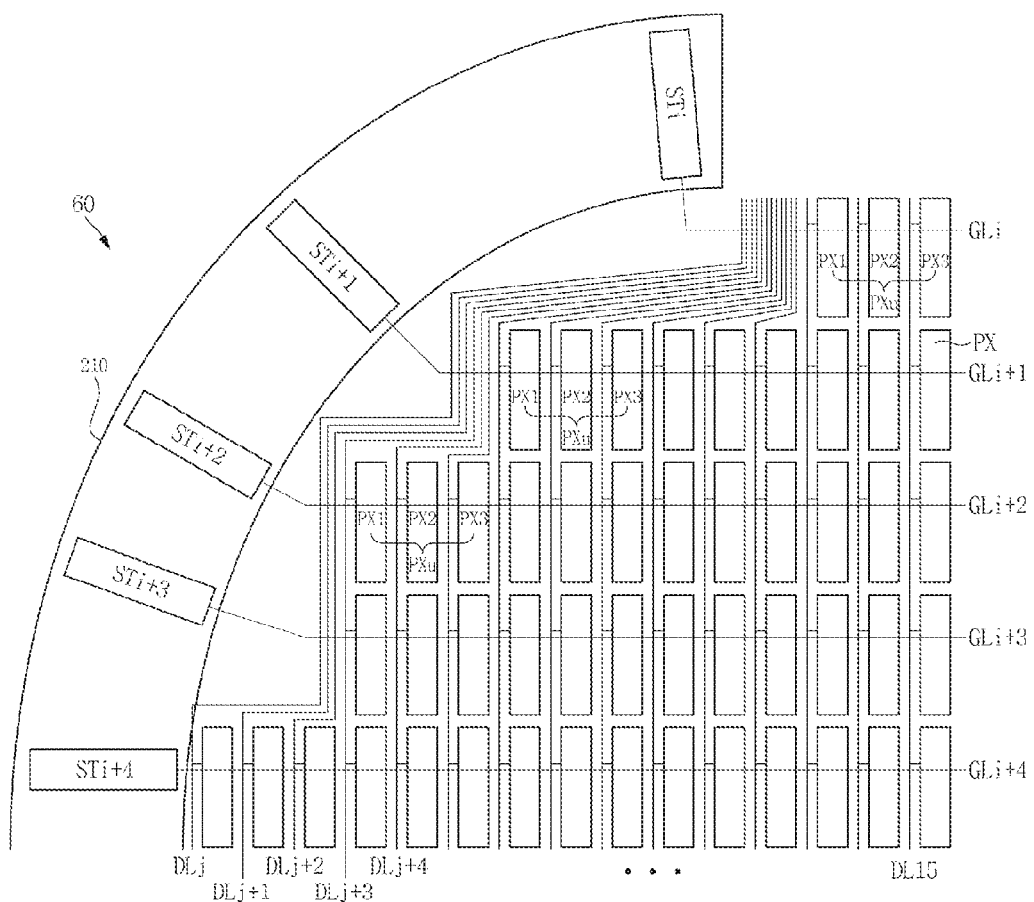
FIG. 15 is a plan view illustrating disposition of pixels of an exemplary embodiment of the display device.

FIG. 15 is a plan view illustrating disposition of pixels PX of the exemplary embodiment of the display device. The exemplary embodiment of the display device is an LCD device 60.

Referring to FIG. 15, a plurality of stages STi, STi+1, STi+2, STi+3, and STi+4 are disposed in a radial shape in a corner of the LCD device 60. A gate driver 210 including the plurality of stages STi, STi+1, STi+2, STi+3, and STi+4 includes a rounded corner corresponding to at least one corner of the first substrate 111 on which the gate driver 210 is disposed.

Hereinafter, an exemplary embodiment will be described with reference to FIG. 16.

Figure 16:
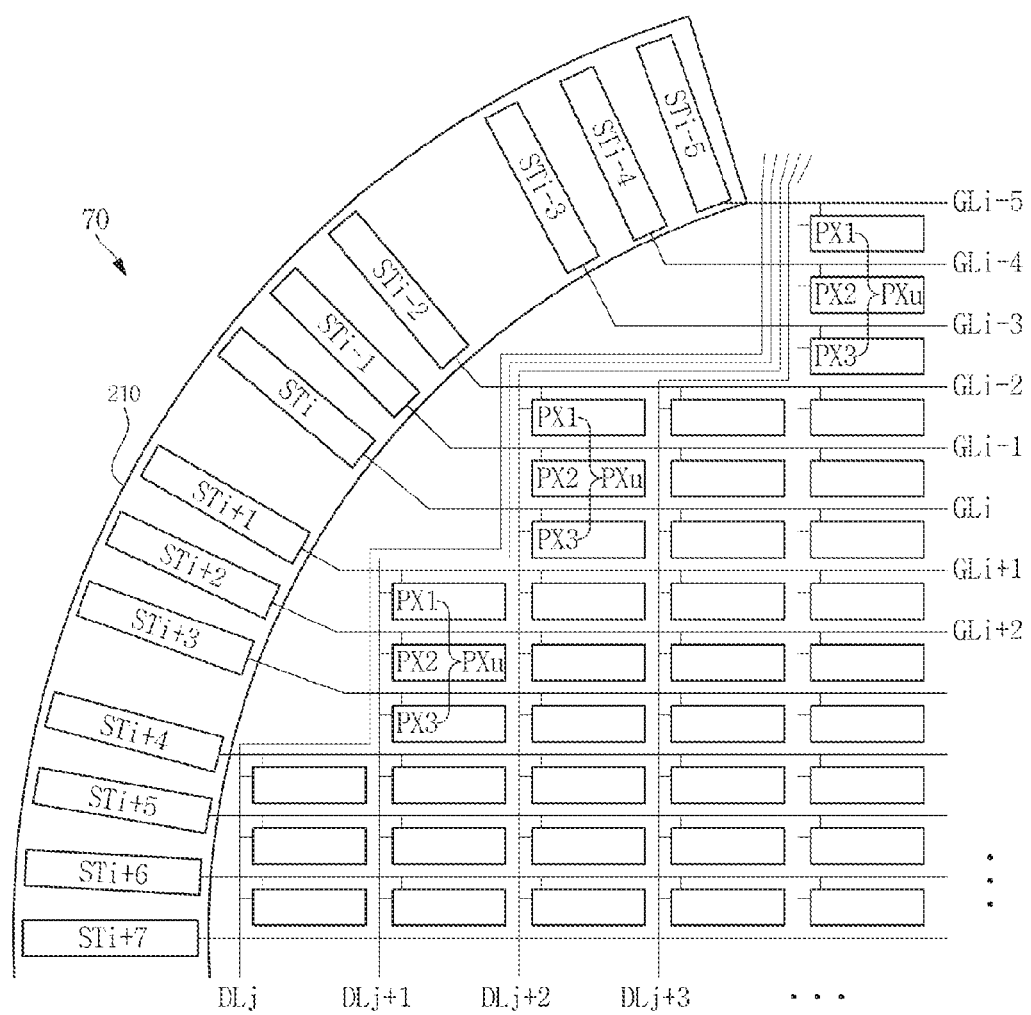
FIG. 16 is a plan view illustrating disposition of pixels of an exemplary embodiment of the display device.

FIG. 16 is a plan view illustrating disposition of pixels PX of the exemplary embodiment of the display device. The exemplary embodiment of the display device is an LCD device 70.

Referring to FIG. 16, a plurality of pixels PX is disposed along the data line DL based on a pixel unit PXu, and a plurality of stages . . . , STi−1, STi, STi+1, . . . is disposed in a radial shape in a corner portion of the LCD device 70. A gate driver 210 including the plurality of stages . . . , STi−1, STi, STi+1, . . . includes a rounded corner corresponding to at least one corner of the first substrate 111 (refer to FIG. 14).

Hereinafter, an exemplary embodiment will be described with reference to FIG. 17.

Figure 17:
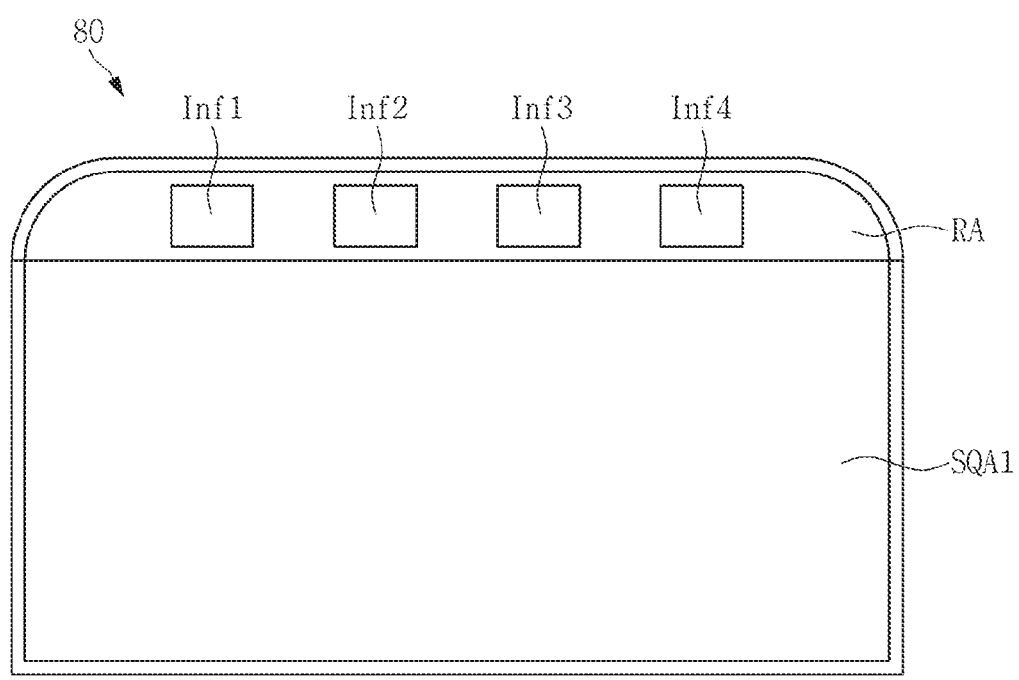
FIG. 17 is a plan view illustrating an exemplary embodiment of the display device.

FIG. 17 is a plan view illustrating the exemplary embodiment of the display device 80.

The exemplary embodiment of the display device 80 has a round shape at an upper left corner and an upper right corner. In addition, the exemplary embodiment of the display device 80 has an upper area RA and a right-angled area SQA1.

The upper area RA may be defined by connecting the rounded upper left corner and the rounded upper right corner. The upper area RA may serve as an information window, and information icons Inf1, Inf2, Inf3, and Inf4 may be displayed on the information window.

The right-angled area SQA1 is positioned below the upper area RA. A main image may be displayed on the right-angled area SQA1. In such an exemplary embodiment, image loss may be prevented in the corner portion of the right-angled area SQA1.

A recent movie screen has a horizontal to vertical ratio of about 21:9. Accordingly, the right-angled area SAQ1 is designed to have a horizontal to vertical ratio of about 21:9 such that image loss in the corner portion may be prevented to display a movie.

Hereinafter, an exemplary embodiment will be described with reference to FIG. 18.

Figure 18:
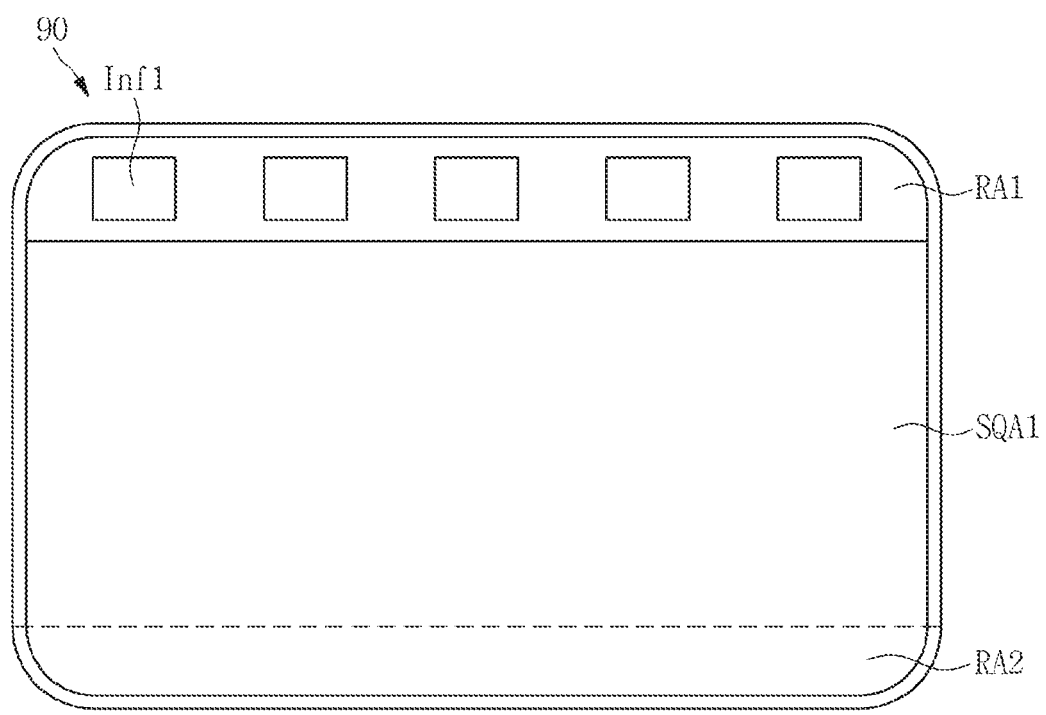
FIG. 18 is a plan view illustrating an exemplary embodiment of the display device.

FIG. 18 is a plan view illustrating the exemplary embodiment of the display device 90.

The exemplary embodiment of the display device 90 has an upper area RA1, a right-angled area SQA1, and a lower area RA2, and has a round shape in upper left and right corners and lower left and right corners.

The upper area RA1 may be defined by connecting the rounded upper left corner and the rounded upper right corner, and serve as a main information window. The lower area RA2 may be defined by connecting the rounded lower left corner and the rounded lower right corner, and serve as a sub-information window. The right-angled area SQA1 is positioned between the upper area RA1 and the lower area RA2.

A recent television screen has a horizontal to vertical ratio of about 16:9. However, the recent movie screen has a horizontal to vertical ratio of about 21:9 and thus does not correspond to the screen ratio of the television. According to the exemplary embodiment, the right-angled area SAQ1 is designed to have a horizontal to vertical ratio of about 21:9 such that a movie having a horizontal to vertical ratio of about 21:9 may be displayed.

Hereinafter, an exemplary embodiment will be described with reference to FIG. 19.

Figure 19:
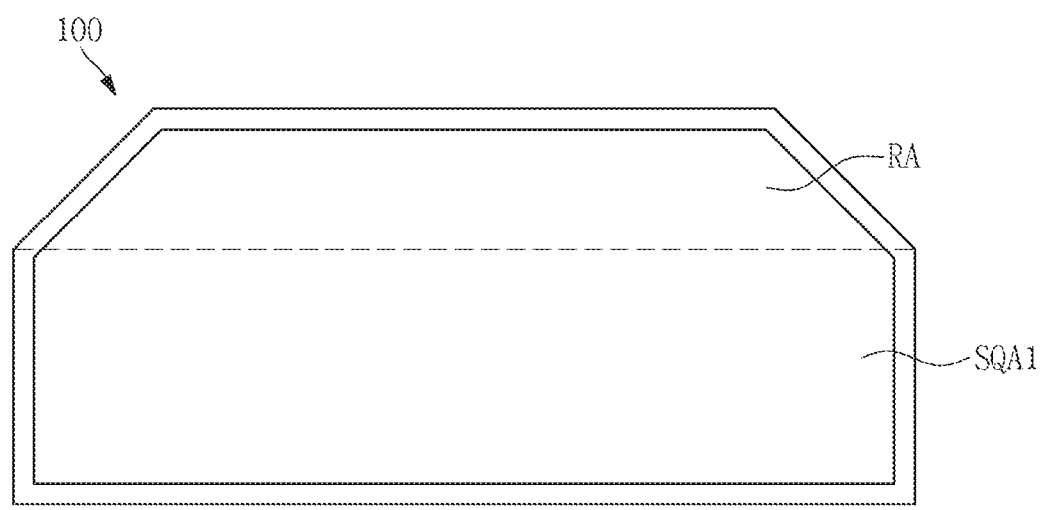
FIG. 19 is a plan view illustrating an exemplary embodiment of a display device.

FIG. 19 is a plan view illustrating the exemplary embodiment of the display device 100.

The exemplary embodiment of the display device 100 has an upper area RA that has a trapezoidal shape, for example, and a right-angled area SQA1 below the upper area RA. The upper area RA may serve as an information window.

Hereinafter, an exemplary embodiment will be described with reference to FIG. 20.

Figure 20:
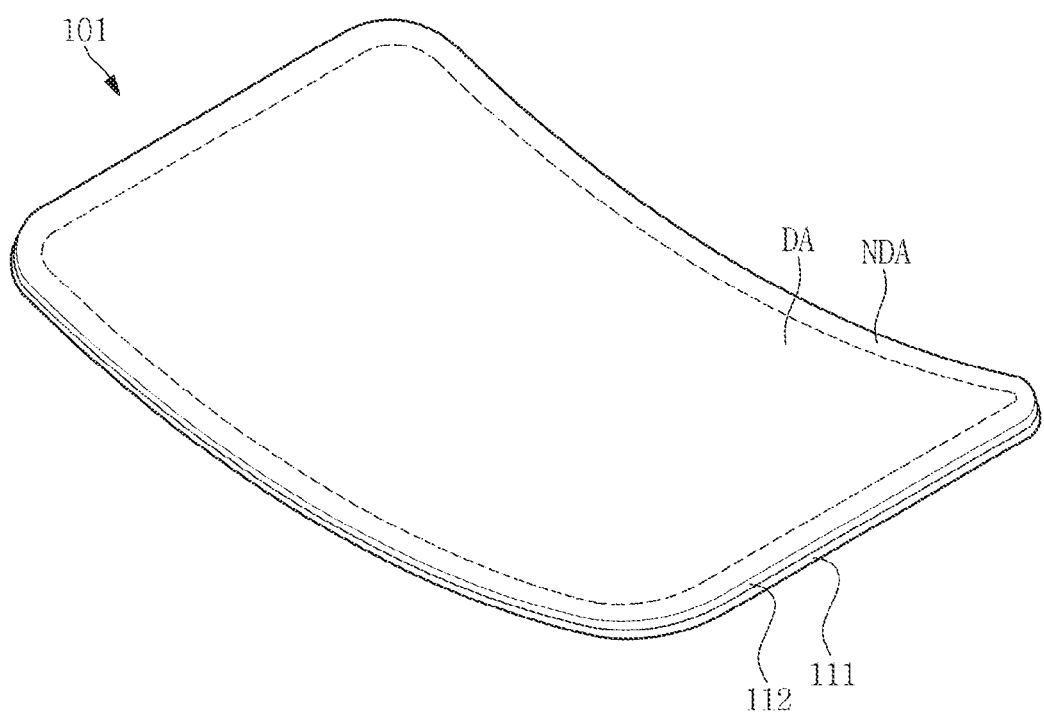
FIG. 20 is a perspective view illustrating an exemplary embodiment of a display device.

FIG. 20 is a perspective view illustrating the exemplary embodiment of the display device 101.

The exemplary embodiment of the display device 101 has a display area DA on which an image is displayed and a non-display area NDA on which an image is not displayed, and has an overall curved shape. Through the use of the display area DA having a curved shape, the display device 101 may display an image improved in terms of a stereoscopic sense, a sense of immersion, and realism.

Referring to FIG. 20, each of a first substrate 111 and a second substrate 112 includes a rounded corner portion. Accordingly, bending stress is prevented from being concentrated to a predetermined point of the corner such that the bending stress of the corner portion is distributed. Therefore, damage to the corner portion may be reduced. In addition, stress between the first substrate 111 and the second substrate 112 is alleviated such that misalignment between the first substrate 111 and the second substrate 112 may be prevented and a mura phenomenon may be prevented.

Hereinabove, exemplary embodiments are described with respect to an LCD device. However, the scope of the exemplary embodiments is not limited to the LCD device. Exemplary embodiments of the invention may be applied to any suitable type of display devices such as an OLED device.

As set forth above, according to one or more exemplary embodiments, the display device has the rounded corner to achieve a highly aesthetic appearance.

Further, according to one or more exemplary embodiments, the display device includes the plurality of stages disposed in a step-like shape in the rounded corner of the substrate. Accordingly, the gate driver may be disposed in a small area secured in the corner of the substrate.

From the foregoing, it will be appreciated that various embodiments in accordance with the invention have been described herein for purposes of illustration, and that various modifications may be made without departing from the scope and spirit of the teachings. Accordingly, the various embodiments disclosed herein are not intended to be limiting of the true scope and spirit of the teachings. Various features of the above described and other embodiments can be mixed and matched in any manner, to produce further embodiments consistent with the invention.

What is claimed is:

1. A display device comprising:
a first substrate;
a plurality of pixels on the first substrate;
a gate driver which is disposed on the first substrate and applies a gate signal;
a plurality of gate lines which is connected to the gate driver and applies the gate signal to each row of the plurality of pixels; and
a plurality of data lines;
wherein the plurality of pixels is disposed in a step-like shape in at least one corner of the first substrate,
the gate driver comprises a plurality of stages in the at least one corner of the first substrate,
at least one of the plurality of data lines comprises a first portion and a second portion which extend in a second direction perpendicular to a gate line of the plurality of gate lines and a third portion which is extending in a first direction parallel to the gate line and disposed between the first portion and the second portion, and
at least one of the plurality of stages is connected to one of the plurality of gate lines to apply the gate signal to one row of the plurality of pixels and overlaps the third portion of the at least one of the plurality of data lines and at least two pixels of another row of the plurality of pixels in the second direction, and
the third portion of the at least one of the plurality of data lines overlaps an entirety of at least two pixels of the plurality of pixels in a same row in the second direction.

2. The display device as claimed in claim 1, wherein the first substrate has a round shape in the at least one corner.

3. The display device as claimed in claim 1, wherein in the at least one corner of the first substrate, the gate driver comprises:
an $i^{th}$ stage where i is a natural number; and
an $i+1^{th}$ stage disposed adjacent to the $i^{th}$ stage,
wherein the $i^{th}$ stage further protrudes in an extension direction of the gate line than the $i+1^{th}$ stage does.

4. The display device as claimed in claim 3, wherein the plurality of pixels comprises:
an $i^{th}$ pixel row connected to the $i^{th}$ stage and an $i^{th}$ gate line; and
an $i+1^{th}$ pixel row connected to the $i+1^{th}$ stage and an $i+1^{th}$ gate line,
wherein the $i+1^{th}$ pixel row comprises more pixels than pixels included in the $i^{th}$ pixel row.

5. The display device as claimed in claim 4, wherein the $i+1^{th}$ pixel row comprises at least two more pixel units than pixel units included in the $i^{th}$ pixel row.

6. The display device as claimed in claim 5, wherein a pixel unit of the pixel units comprises a blue pixel, a red pixel, and a green pixel.

7. The display device as claimed in claim 6, wherein the pixel unit further comprises a white pixel.

8. The display device as claimed in claim 4, wherein the $i+1^{th}$ pixel row further comprises four more pixel units than pixel units included in the $i^{th}$ pixel row.

9. The display device as claimed in claim 3, wherein the plurality of pixels is disposed along the at least one of the plurality of data lines based on a pixel unit.

10. The display device as claimed in claim 9, wherein the pixel unit comprises a blue pixel, a red pixel, and a green pixel.

11. The display device as claimed in claim 10, wherein the pixel unit further comprises a white pixel.

12. The display device as claimed in claim 9, wherein the plurality of pixels comprises:
an $i^{th}$ pixel row connected to the $i^{th}$ stage and an $i^{th}$ gate line; and
an $i+1^{th}$ pixel row connected to the $i+1^{th}$ stage and an $i+1^{th}$ gate line,
wherein the $i+1^{th}$ pixel row comprises at least one more pixel than pixels included in the $i^{th}$ pixel row.

13. The display device as claimed in claim 1, wherein in the at least one corner of the first substrate, the gate driver comprises:
a $k^{th}$ stage where k is a natural number; and
a $k+1^{th}$ stage disposed adjacent to the $k^{th}$ stage,
wherein the $k+1^{th}$ stage further protrudes in an extension direction of the gate line than the $k^{th}$ stage does.

14. The display device as claimed in claim 13, wherein the plurality of pixels comprises:
a $k^{th}$ pixel row connected to the $k^{th}$ stage and a $k^{th}$ gate line; and
a $k+1^{th}$ pixel row connected to the $k+1^{th}$ stage and a $k+1^{th}$ gate line,
wherein the $k^{th}$ pixel row comprises more pixels than pixels included in the $k+1^{th}$ pixel row.

15. The display device as claimed in claim 14, wherein the $k^{th}$ pixel row comprises at least two more pixel units than pixel units included in the $k+1^{th}$ pixel row.

16. The display device as claimed in claim 1, further comprising:
a thin film transistor connected to the gate line and the at least one of the plurality of data lines.

17. The display device as claimed in claim 16, wherein the at least one of the plurality of data lines has one of a step-like shape, a diagonal shape, and a curved shape between the gate driver and a region in which the plurality of pixels is disposed.

18. The display device as claimed in claim 1, further comprising a light blocking unit on the first substrate,
wherein the light blocking unit defines a display area and a non-display area of the first substrate in a plan view.

19. The display device as claimed in claim 18, wherein the light blocking unit has a round shape corresponding to the at least one corner of the first substrate.

20. The display device as claimed in claim 1, further comprising a light blocking unit,
wherein the light blocking unit overlaps at least a pixel in the at least one corner of the first substrate.

21. The display device as claimed in claim 1, wherein the gate driver has a round shape corresponding to the at least one corner of the first substrate.

22. The display device as claimed in claim 1, further comprising:
a second substrate opposing the first substrate;
a liquid crystal layer between the first substrate and the second substrate; and
a sealing unit bonding the first substrate and the second substrate.

23. The display device as claimed in claim 1, wherein the third portion is disposed between at least one of the plurality of pixels and the at least one of the plurality of stages.

24. The display device as claimed in claim 1, wherein the plurality of stages is disposed in a step like shape corresponding to the plurality of pixels.

* * * * *